United States Patent
Van Oort et al.

(10) Patent No.: US 10,915,595 B1
(45) Date of Patent: Feb. 9, 2021

(54) DEVICES, SYSTEM AND METHOD FOR ASSOCIATING A TENGIBLE ASSET WITH AN WEBSITE OR TARGET URL

(71) Applicant: R & D Industries, Inc., Milford, IA (US)

(72) Inventors: Donald J Van Oort, West Okoboji, IA (US); Christopher Van Oort, Ames, IA (US); Christopher Waters, Ames, IA (US)

(73) Assignee: R&D Industries, Inc., Milford, IA (US)

( * ) Notice: Subject to any disclaimer, the term of this patent is extended or adjusted under 35 U.S.C. 154(b) by 506 days.

(21) Appl. No.: 14/877,512

(22) Filed: Oct. 7, 2015

Related U.S. Application Data

(60) Provisional application No. 62/060,933, filed on Oct. 7, 2014.

(51) Int. Cl.
*G06F 16/955* (2019.01)
*G06F 16/22* (2019.01)

(52) U.S. Cl.
CPC ...... *G06F 16/9566* (2019.01); *G06F 16/2228* (2019.01)

(58) Field of Classification Search
CPC .............................................. G06F 17/30887
See application file for complete search history.

(56) References Cited

U.S. PATENT DOCUMENTS

| | | | | |
|---|---|---|---|---|
| 2005/0080555 A1* | 4/2005 | Parupudi | ................. | H04L 29/06 709/217 |
| 2007/0260576 A1* | 11/2007 | Elliott | ................ | G06Q 30/0603 |
| 2008/0189778 A1* | 8/2008 | Rowley | ................. | H04L 9/3213 726/9 |
| 2009/0063232 A1* | 3/2009 | Lissack | ............. | G06Q 10/1095 705/7.21 |
| 2012/0214443 A1* | 8/2012 | Daigle | .................. | H04L 9/3228 455/411 |
| 2013/0102248 A1* | 4/2013 | Jay | ........................ | H04L 67/02 455/41.1 |
| 2014/0304077 A1* | 10/2014 | Wingle | ............. | G06Q 30/0241 705/14.61 |
| 2015/0025981 A1* | 1/2015 | Zaretsky | ........... | G06F 17/30887 705/14.73 |
| 2015/0058254 A1* | 2/2015 | Hulth | ........................ | G09F 9/00 705/347 |
| 2015/0079942 A1* | 3/2015 | Kostka | .................... | H04W 4/21 455/411 |
| 2015/0112790 A1* | 4/2015 | Wolinsky | ........... | G06Q 30/0238 705/14.38 |
| 2015/0324400 A1* | 11/2015 | Sheck | .................... | H04L 67/22 707/795 |
| 2016/0295358 A1* | 10/2016 | Cariss | .................... | H04W 4/30 |

FOREIGN PATENT DOCUMENTS

EP        2800403 A1 * 11/2014  ............ H04W 12/10

* cited by examiner

*Primary Examiner* — Dawaune A Conyers
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to various apparatus, systems and methods relating to associating a tangible item or asset with a specific website by way of a paired signaler and target URL. A wireless communicator and short URL may be used. The system utilizes cloud management platforms and human readable URLs. The signaler may be re-used with multiple target URLs.

18 Claims, 25 Drawing Sheets

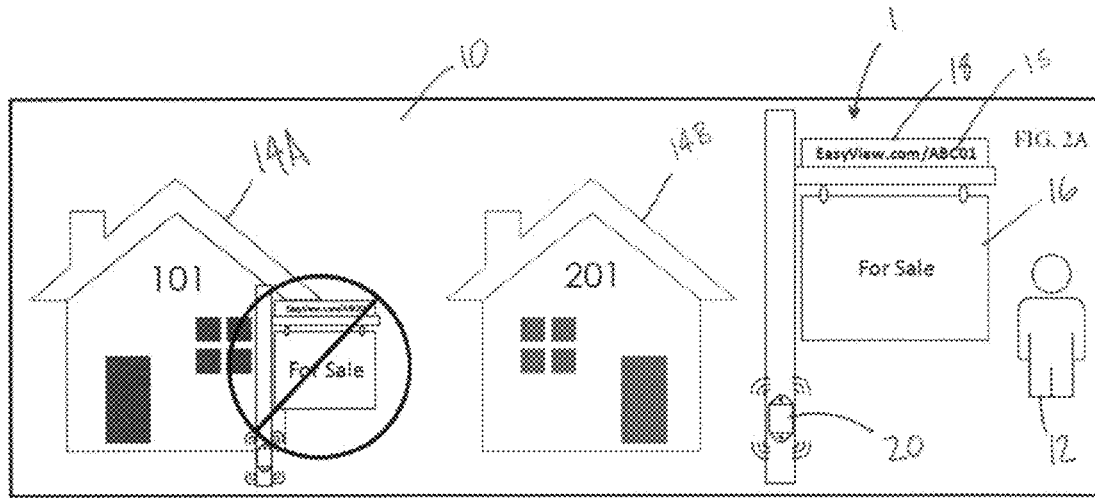
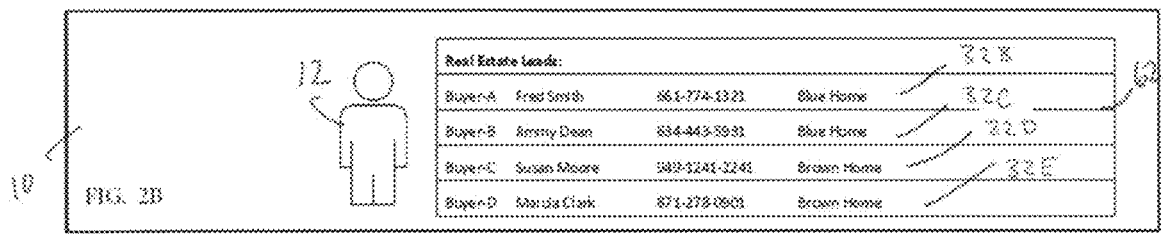
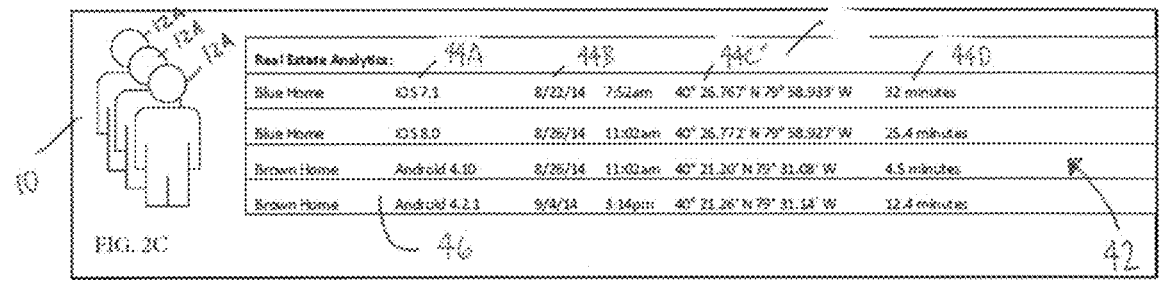
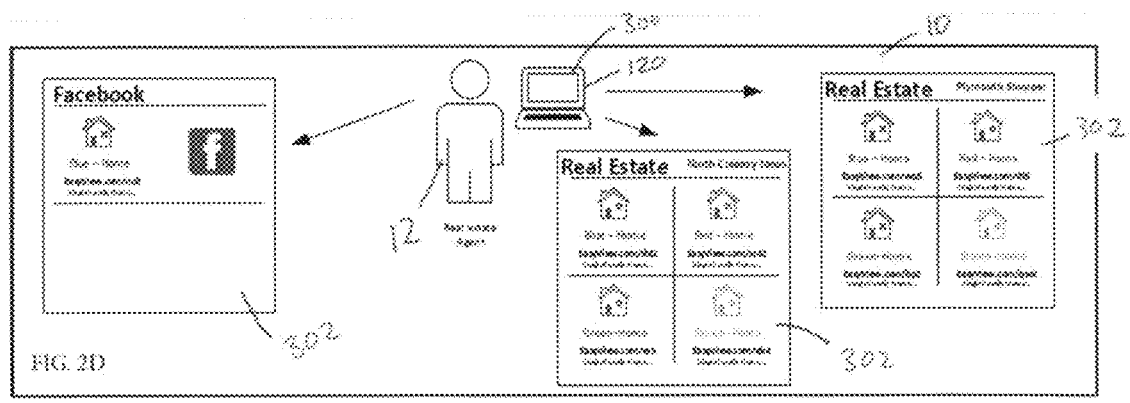

Server Beacon Listing Lookup
Workflow

Server Tokenized Redirect Creation Workflow

Tokenized Redirection Workflow/Opening the Tokenized Redirect

Server Tokenize Redirect
Validation Workflow

DEVICES, SYSTEM AND METHOD FOR ASSOCIATING A TENGIBLE ASSET WITH AN WEBSITE OR TARGET URL

CROSS-REFERENCE TO RELATED APPLICATION(S)

This application claims priority to U.S. Provisional Application No. 62/060,933 filed Oct. 7, 2014 and entitled "System & Method for Assigning," which is hereby incorporated by reference in its entirety under 35 U.S.C. § 119(e).

TECHNICAL FIELD

The disclosure relates to apparatus, systems and methods relate to associating a tangible item, such as an asset, with a target URL.

BACKGROUND

A frequent issue in the digital world is the ability to associate tangible items with online information. Several attempts to do so have been made, such as the QR code. However, these attempts have been generally unsuccessful, as they were often cumbersome or otherwise difficult to work with.

The disclosure relates to systems and methods for directing a user to a specific website, or domain by way of a signaler to facilitate the association of tangible, or real world assets, locations and the like with online target uniform resource locators ("URLs").

There is a need in the art for improved devices, systems and methods relating to the association of tangible assets with online information and offerings.

BRIEF SUMMARY

Discussed herein are various embodiments relating to the signaling device, system and method, which allows for the association of a unique, reusable signaler with a variety of assets and corresponding target URLs, such that a user may be directed to a webpage specific to the asset by way of the reusable signaler. In further embodiments, the signaler may be re-used to be serially associated with a plurality of different assets. In yet further embodiments; the signaler features a human readable short uniform resource locator ("URL"), which can be serially re-assigned to paired assets and target URLs. The disclosed apparatus, systems and methods therefore relate to various apparatus, systems and methods relating to associating an asset with a target website by way of a signaler.

In various embodiments, a system of one or more computers can be configured to perform particular operations or actions by virtue of having software, firmware, hardware, or combinations of them installed on the system that in operation causes or cause the system to perform the actions. One or more computer programs can be configured to perform particular operations or actions by virtue of including instructions that, when executed by data processing apparatus, cause the apparatus to perform the actions. Other embodiments include corresponding computer systems, apparatus, and computer programs recorded on one or more computer storage devices, each configured to perform the actions of the methods.

Exemplary embodiments of the system for associating an asset with a website comprises an asset, a signaler further comprising a short URL, and a database in operational communication with the signaler and associated with a webpage associated with the asset, wherein the signaler is configured to be placed near the asset such that the shortened URL is visible to a prospective purchaser, who can be re-directed to the webpage by way of their mobile browser, and further wherein the signaler is adapted to be reused with multiple assets without altering the shortened URL.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a reusable signaling apparatus for associating assets with target URLs, including: a signaler including an indicator, a target URL, and an operations system. The reusable signaling apparatus also includes a server. The reusable signaling apparatus also includes a database. The reusable signaling apparatus also includes a software platform. The reusable signaling apparatus also includes where the software platform is capable of associating the signaler with the asset and target URL by way of the indicator. Other embodiments of this aspect include corresponding computer systems, apparatus, and computer programs recorded on one or more computer storage devices, each configured to perform the actions of the methods.

Implementations may include one or more of the following features. The reusable signaling apparatus where the signaler further includes a short URL. The reusable signaling apparatus further including a human readable short URL. The reusable signaling apparatus where the signaler further includes a wireless communicator. The reusable signaling apparatus further including a custom domain platform. The reusable signaling apparatus further including a mobile application. The reusable signaling apparatus further including: a short URL, a wireless communicator including a range, and a mobile application configured to detect the wireless communicator range and provide notification including the target URL. The reusable association system further including a human readable short URL. The reusable association system further including a tokenized redirection process. The reusable association system where the signaler further includes a wireless communicator. The reusable association system further including a cloud management system. The reusable association system further including a mobile application. The system further including a human readable short URL platform. The system where the human readable short URL platform further includes case sensitivity disambiguation and character disambiguation. The system where a plurality of short URLs are associated with the target URL. The system further including a custom domain short URL. The system where the operations system is configured to generate analytics and evaluate referral sources. The system where the system further includes an advertising platform. Implementations of the described techniques may include hardware, a method or process, or computer software on a computer-accessible medium.

One general aspect includes a reusable association system for associating assets with target URLs, including: a signaler including at least one indicator selected from the group including of a short URL and at least one wireless communicator. The reusable association system also includes a target URL. The reusable association system also includes a networked server including an internet connection. The reusable association system also includes a database. The reusable association system also includes an operations system further including a software platform. The reusable association system also includes where the software platform is configured to record the association of a target URL with a signaler within the database for redirection by way of the internet connection. Other embodiments of this aspect include corresponding computer systems, apparatus, and computer programs recorded on one or more computer storage devices, each configured to perform the actions of the methods.

Implementations may include one or more of the following features. The reusable association system further including a human readable short URL. The reusable association system further including a tokenized redirection process. The reusable association system where the signaler further includes a wireless communicator. The reusable association system further including a cloud management system. The reusable association system further including a mobile application. The system further including a human readable short URL platform. The system where the human readable short URL platform further includes case sensitivity disambiguation and character disambiguation. The system where a plurality of short URLs are associated with the target URL. The system further including a custom domain short URL. The system where the operations system is configured to generate analytics and evaluate referral sources. The system where the system further includes an advertising platform. Implementations of the described techniques may include hardware, a method or process, or computer software on a computer-accessible medium.

One general aspect includes a system for associating an asset with a target URL for a prospective purchaser on a mobile device, including: at least one signaler, further including a human readable short URL. The system also includes a wireless communicator. The system also includes an operations system. The system also includes a networked server. The system also includes a database in operational communication with the networked server and configured to associate the at least one signaler with the target URL. Other embodiments of this aspect include corresponding computer systems, apparatus, and computer programs recorded on one or more computer storage devices, each configured to perform the actions of the methods.

Implementations may include one or more of the following features. The operations system is configured to generate analytics and evaluate referral sources. The system further includes an advertising platform. Implementations of the described techniques may include hardware, a method or process, or computer software on a computer-accessible medium.

There are many benefits of using a human readable short URL. For example, there is no requirement for an application (or "app") to view a short URL. All that is required is that a user correctly enter the short URL into a browser. To do so, a user must recognize the sequence as a URL, and must be able to type it easily. The present system, methods and devices have improved the ability for the user to type a short URL by eliminating letters and numbers that can be misread. In exemplary embodiments, normal case sensitivity has also been used to allow the user to type a short URL "string" as simply as possible.

Certain examples of the system comprise character disambiguation. In these implementations, the character set used for a short URL reduces errors in confusing letters such as: "i," "I," "l," (lower case i, upper case i, lower case L), and the like. Similarly, "0" (zero) and the letter O ("oh") are also disambiguated, meaning that the system recognizes both as identical, thereby reducing human error.

Certain examples of the system comprise case sensitivity disambiguation. For example, elimination of case sensitivity makes "ABC123" equivalent to "abc123." Case sensitivity disambiguation also allows characters to be emphasized for readability, for example somewhere.com/PartsList is recognized by these embodiments as the same as somewhere.com/partslist, with the former being easier to read. This is not a standard feature of current URL shorteners, which fosters error because many devices and smartphones will automatically capitalize the first letter entered.

Certain examples of the system comprise an agnostic short URL system. Short URL technology can be used with any underlying protocol. In exemplary embodiments, when a user enters a short URL, they do so using hypertext transfer protocol ("HTTP"), or secure hypertext transfer protocol ("HTTPS"). However, in alternate embodiments, the human readability and convenience of the short URL described herein can run on other protocols, and can also be applied in situations where other protocols are used.

Various implementations can be utilized in real estate listings and vehicles including but not limited to: automobiles, trucks, boats, ships, ATVs, motorcycles, and the like, as well as in asset tracking and asset maintenance. Further implementations can be utilized in geolocation, mapping, safety and further implementations.

Certain examples of the system comprise re-usable printed signs. In these embodiments, a printed short URL is placed on a real estate sign. When the real estate sign is placed in front of a first home for sale, the short URL is dynamically mapped (assigned) to information on the first home. When the first home has been sold, the sign can be placed in front of a second home for sale. The short URL is now re-assigned and mapped to information on the second home for sale. This allows a printed sign to be used for multiple purposes over-and-over, and allows the viewer of the sign to get contextually relevant information based on how the sign is used.

Certain examples of the system feature long life printed information. In these implementations, a printed short URL is mapped to information on the internet over long periods of time. This is done by creating a system whereby a short URL can be printed and the URL can be dynamically re-assigned. Accordingly, printed short-URLs can be managed over long periods of time. Imagine a short URL printed on the vehicle information tag in a car's door jam. In this case, the manufacturer would desire the ability to connect this information to the target information and would want to manage that link over a long period of time. As website technology is changed, websites are moved, or mergers of a company occur, dynamic remapping technology allows a printed URL to be managed over long periods of time, and redirect users to the appropriate or updated information.

Various implementations of the system incorporate collecting analytics. In these embodiments, as users view information on a printed sign, and enter a short URL, analytics can be collected automatically. This information can provide a great deal of information about the individual viewing the information. This information may include, but is not limited to, time-of-day, date, type of browser, screen resolution, type of device, user location, user history, and the like.

Certain examples of the system feature marketing and contextually relevant interstitial advertisement. In these examples, as users view information on a signaler, and enter a short URL, an interstitial advertisement can be played or displayed to the user. This interstitial can be used for marketing, advertising or to notify the user of other relevant information. As an example, if a short URL is used on the vehicle identification tag in a car's door jam, the user could be notified of recalls pertaining to this particular model of vehicle.

In various embodiments, the system can further comprise a web connection. The web connection can comprise a set of operations, inputs, outputs, and underlying data structures. The web connection can also allow for client-to-server communication so that data can be exchanged between the client and the server without need for server-side implementation knowledge.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 2A is a schematic of a commercial user reusing a signaler with a second asset.

FIG. 2B depicts the embodiment of FIG. 2A, wherein the commercial user collects analytics.

FIG. 2C depicts the embodiment of FIG. 2A, wherein the commercial user collects further analytics.

FIG. 2D depicts the embodiment of FIG. 2A, wherein the commercial user utilizes an advertising campaign.

DETAILED DESCRIPTION

Figure 1A:
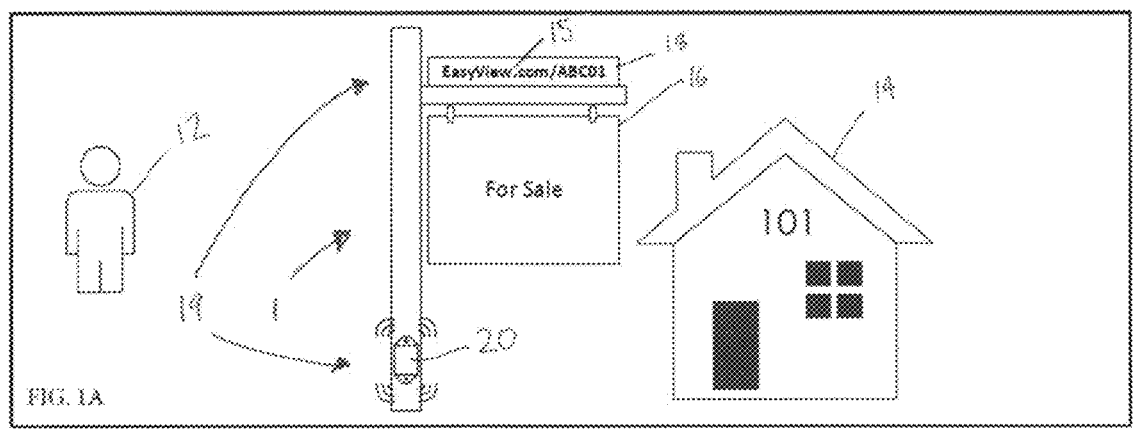
FIG. 1A is a schematic view of an exemplary embodiment of the system showing the placement of a signaler near an asset.

The disclosed devices, systems and methods relate to methods of associating a tangible asset with a specific website or domain name. While the various devices, systems and methods are described herein as a "signaler" or "system," these references are made for brevity, rather than to limit the scope of any particular embodiment.

FIGS. 1-15B show various aspects and embodiments of the system 10 for associating an asset 14 comprise a re-usable signaler 1 and a target URL 28 and varying levels of automated assistance for associating the asset 14 with the target URL 28. In various embodiments, the signaler comprises at least one indicator 19, which can be a wireless communicator (or "beacon") 20 or a short URL 15. In certain embodiments, both indicators—at least one beacon 20 and a short URL 15—may be provided, but this is not necessary for the system 10 to function, as either is able to redirect a user or prospective purchaser to the target domain 28. Exemplary embodiments can also comprise a sign 16, a visual cue or rider 18, and or other features known to typical signs, placards, stickers, posters and the like.

The system further comprises an operations system 104, a server 200 and a database 220 which is accessed by way of the operations system 104 and various software 100 platforms, including a "cloud management platform," which can comprise a signaler manager 102. In exemplary embodiments, the operations system 104, server 200 and database 220 comprise computer-readable media and a data processing system 201 for monitoring, recording and modifying the association 1000 of signalers 1 with target URLs 28. The system 10 is also configured for providing those associations 1000 to users 12 and prospective purchasers 32 by way of an internet connection 110 so as to re-direct the users 12 and prospective purchasers 32 to the target URL 28.

In certain implementations, the signaler 1 comprises a sign 16, such as a real estate sign, though other implementations can be used, such as a placard or other physical media which is capable of both displaying a visual or electronic cue, such as to beacon 20. In certain aspects of the invention, the devices, methods and systems relate to providing two indicators 19: both a short domain name ("short URL" 15) and a wireless tag (beacon 20) which are associated with an asset for purposes of easily directing a user to a target URL 28. The target domain 28 may further comprise a webpage containing information about the asset, such as an online real estate listing for a house. Other implementations are possible. For example, the system can be applied to automotive sales, boat sales, and sales of other tangible assets. Further implementations are also possible, such as in geolocation and other situations in which a user or purchaser wishes to quickly and easily locate specific online information related to a physical object or location.

Turning to the drawings in greater detail, FIGS. 1A-1F depict several schematic overviews of various aspects of the tracking system 10, according to an exemplary embodiment. FIG. 1A depicts a commercial user 12, such as a real estate agent, and a first asset 14A which is being listed for sale. FIG. 1A also depicts an embodiment of the signaler 1, which can comprise a sign 16 and/or a rider 18, and at least one of a short URL 15 and a wireless communicator, such as a beacon 20. In certain embodiments, the signaler 1 is placed in the proximity of the first asset 14A, here a first home. Such signaler 1 placement would be understood by one of skill in the art, and is discussed in further detail in relation to FIG. 3A.

Figure 1B:
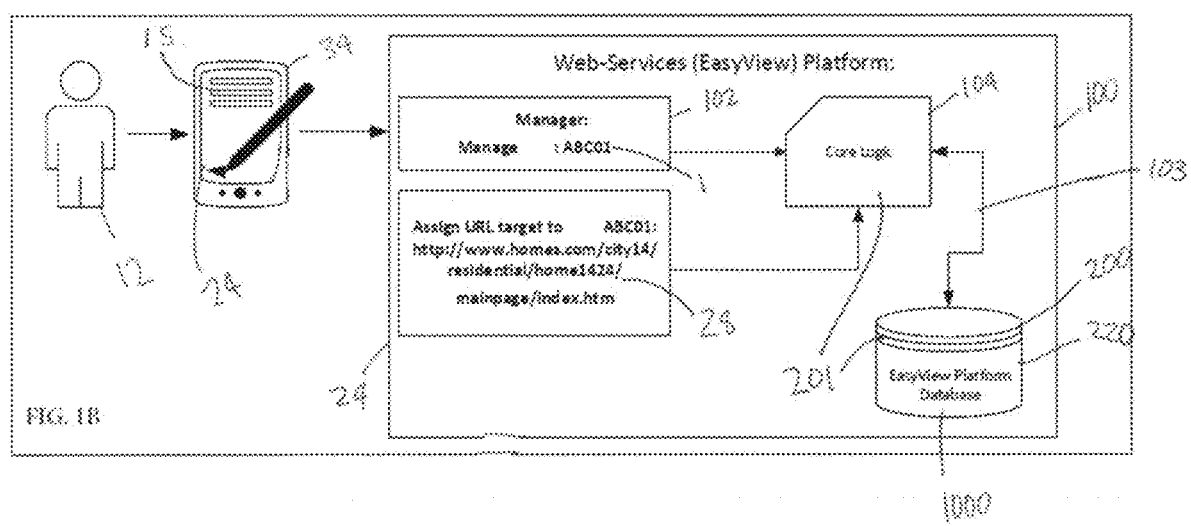
FIG. 1B is a schematic view of an exemplary embodiment of the system showing the placement of a signaler near an asset and system architecture.

As shown in FIGS. 1A-B, exemplary embodiments of the system 10 provide for the serial re-use of a signaler 1 with a variety of assets 14 and target URLs 28 without altering the indicator 19 (short URL 15 and/or beacon 20). In these embodiments, the signaler 1 may be moved from a first asset 14A associated with a first target URL 28A to a second asset 14B associated with a second target URL 28B without the need to alter the signaler 1, short URL 15 or beacon. A cloud management process comprising a signaler manager 102 is provided to facilitate reusability.

In these embodiments, a short URL 15 does not require signaler 1 encoding and subsequent decoding, and the related knowledge. This results in ease of use for commercial users, as will be explained in detail below. The software platforms and ease of assigning one the signaler between assets also does not require previous knowledge of the system 10 for use. A cloud management platform is therefore provided such that a signaler does not need to be changed, reprogrammed, reprinted, or otherwise updated in order to resolve to the correct target URL 28. Further, according to various implementations, a beacon 20 can be used indefinitely with the signaler 1, such that it does not need to be reprogrammed when the destination URL needs to be updated when the associated tangible asset changes.

In exemplary embodiments, the reusable signaler 1 further comprises a human-readable domain name, or short URL 15, which can appear on signaler 1, for example on the sign 16 or on a rider 18. In these embodiments, human readable can mean that a person can view the short URL 15, understand it is a URL, and type it into a web browser. Because of the short length, it is easily remembered. In certain embodiments, similar looking characters such as the number "0" and the letter "O" are not differentiated, such that domain.com/abc1O and domain.com/abc1o are both interpreted and understood by the system 10 as identical, and therefore resolve to the same target URL 28. By way of further example, in certain embodiments, "i," "I," "L," "l" (the letter "el"), and/or "1" (the number "one") can all be interpreted as the same character. As can "o," "O," and "0" (the number "zero"). As would be apparent to one of skill in the art, further examples are possible.

As is depicted in FIG. 1B, a commercial user 12 is able to access a database 220 by way of a commercial platform 24 of the software 100 comprising a signaler manager 102 and the operations system and core logic 104. The signaler manager 102 has the ability to associate the components of the signaler 1, such that an individual sign 16, beacon 20, rider 18 and/or short URL 15, are associated with one another and an online target URL 28 within a database 220. For example, the target URL 28 can be the link to a webpage on a real estate agency's website depicting information about the asset 14, or other online information relating to the asset, such as a car dealership, boat dealership, or other implementation, as would be understood by one of skill in the art. Accordingly, this process associates the sign 16, pre-printed short URL 15 on the rider 18 and beacon 20 with a longer, specific target URL 28 within the database for access by way of the software on a user's device 34. In exemplary embodiments, this linking on the signaler manager 102 is performed by way of a mobile device 34. In alternative implementations, this is done by way of a networked computer 120, as is described in relation to FIGS. 4A-4B. In exemplary embodiments, core logic 104 facilitates the action and routing of information from the various software 100 platforms, database 220, commercial users 12, purchasers 32, devices 34 and other parties, as is also described in relation to FIGS. 3 and 6-14.

Critically, one aspect of the system 10 is the ability to re-use a signaler 1 to redirect to a variety of assets 14 and target URLs 28 by use of the same short URL 15. Further, as described herein, the management of the signalers and associations can be done by way of a cloud management system, or signaler manager 102, as described herein. As is shown in FIG. 1D, in various embodiments, purchasers 32A, 32 are redirected to the target URL 28. In these embodiments, the first purchaser's 32A device 34A browser 36 is redirected to the target URL 28 of the asset 14, based on a database 220 lookup, as is described further in relation to FIGS. 4A-C. Additionally, and as described further in relation to FIGS. 4A-B, a commercial user 12 may link the target URL 28 to a new or existing signaler 1, including a sign 16, rider 18, and as applicable the short URL 15 (shown at 230). The system 10 thereby stores the target URL 28 information in the database 220, including information relating to the linked signaler 1.

Returning to FIGS. 1A-F, while various software platforms are also provided, for brevity these will collectively be referred to as software 100 in general descriptions relating to the software, but should be understood to comprise the networked components and connections there between. In various embodiments, the system 10 also comprises a networked server 200 which is in electronic communication with the internet 110, and further comprises an operations system 103 which is in communication with the database

220. The operations system is also in communication with several discrete websites, as will be explained in further detail below.

Figure 1C:
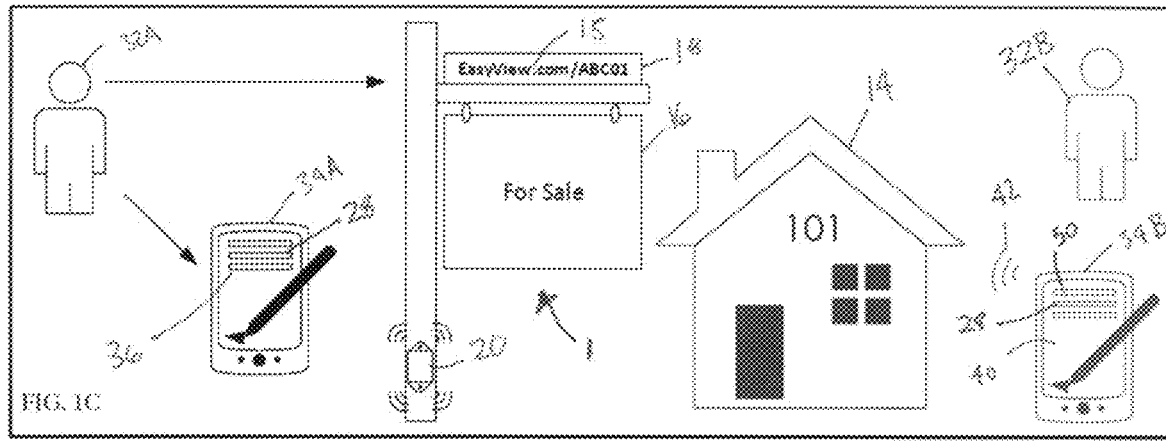
FIG. 1C is a schematic view of a further embodiment of the system showing the placement of a signaler near an asset showing prospective purchasers using their mobile devices.
Figure 1D:
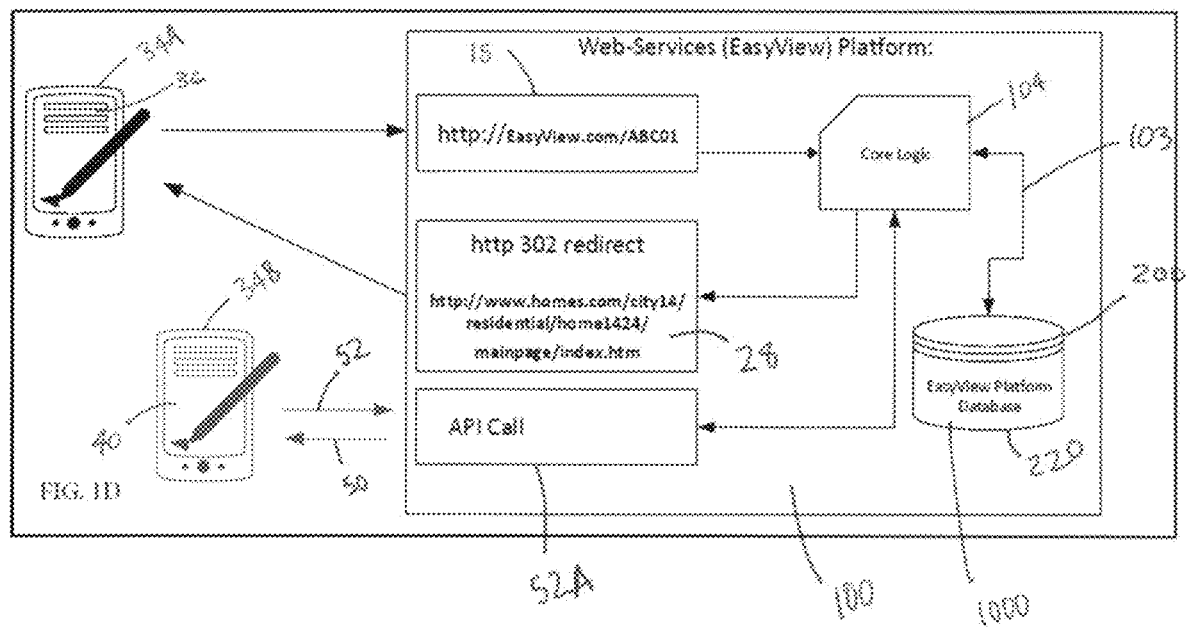
FIG. 1D is a schematic view of the embodiment of FIG. 1C, showing the interaction of the devices with the system.

As shown in FIGS. 1C-D, in exemplary embodiments of the system 10, software 100 is in communication with the server 200 such that the components of a specific signaler 1 are associated with a target URL 28 by way of and within a database 220. When prospective purchaser 32 desires information about an asset, the signaler 1 provides the purchaser with electronic, visual or other cues such as the short URL 15 and/or beacon 20 which allow the purchaser's device 34 to query the database 220 so as to find a link between the asset and a target listing 28, which contains the information about the asset.

As shown in FIG. 1D, the system 10 can also comprise a mobile application 40, which allows the target URL 28 to be displayed within the mobile application 40. This mobile application 40 can also serve for the direct input of the short URL 15, or serve to receive the signal from the beacon 20, and transmit that information to the system server 200, 242 and database 220. As would be appreciated by those of skill in the art, each of the many connections between the device 34 or computer 120, server 200, third party server 242, and database may also comprise a web, or browser connection.

Continuing with FIG. 1D., a variety of connections between a user device and the system 10 are possible. In various embodiments, the database 220 is accessible over the internet 110 by the mobile application 40, which may further comprise a mobile application programming interface ("API") 52. The server 200 and database 220 may also be accessed by a browser 36. The mobile application 40 mobile API 52 can allow for client-to-server communication with the system's 10 mobile application 40, as would be appreciated by one of skill in the art. In exemplary embodiments, the mobile application mobile API 52 is not open to the public and requires a valid key to access. In these embodiments, the valid key is safely stored in the mobile application 40. In alternate embodiments, a tokenized redirection process can be used to ensure security in redirection when a browser 36 is utilized. Further discussion of the token system is found in relation to FIG. 12.

As is shown in FIG. 1C, using the system 10, a prospective purchaser 32 is able to use the signaler 1 to find, or be redirected to the target URL 28. A plurality of prospective purchasers 32A, 32B are now exposed to the asset 14 (a first home), and may desire information about that asset 14. In various embodiments, certain purchasers 32A may not have a mobile application 40 installed on their device 34A, while in other embodiments the purchaser 32B does have a mobile application 40 installed on their device 34B.

Continuing with FIG. 1D, if either prospective purchaser 32A, 32B is able to be directed to the target URL 28. In the case of the purchaser 32A without the application, this can be done by way of direct entry of the short URL 15 from the rider 18 into an internet browser 36 on a device 34A. In other embodiments comprising the application 40, the target URL 28 can be accessed by recognition of the beacon 20 (shown at 42) by the device 34B. In certain embodiments, a prospective purchaser 32 may be automatically alerted to the presence of a nearby asset 14, such as by way of a notification 50, such as a push notification (discussed below in relation to FIGS. 3-4A and 9).

In these embodiments, analytics 55 and information on the purchasers 32A, 32B can also be collected by the system 10 and provided to the commercial user 12. In certain embodiments, these analytics 55 are automatically associated with the asset 14. By way of example, contact information for the purchaser 32A is sent to the commercial user 12 in FIG. 1. Similarly, the second purchaser's 32B device 34B can automatically present information on the asset by way of a notification 50, based on an API 52 request 52A to the system 10 software 100. Further discussion of the other system 10 connections can be found in relation to FIGS. 4A-4D.

Figure 1E:
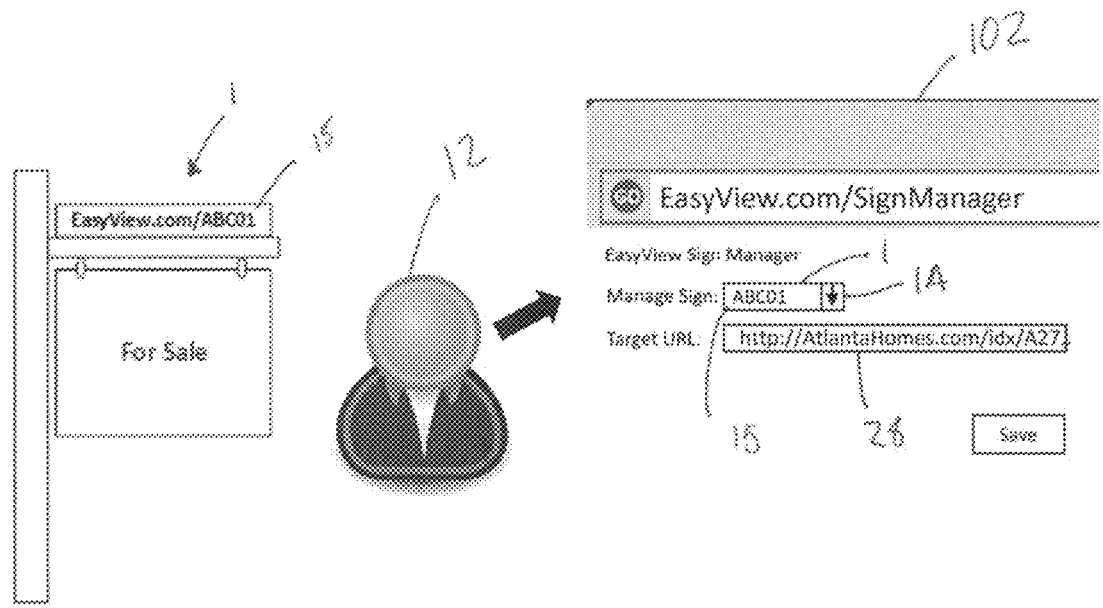
FIG. 1E depicts an embodiment of the system wherein a commercial user associates a signaler with a target URL.
Figure 1F:
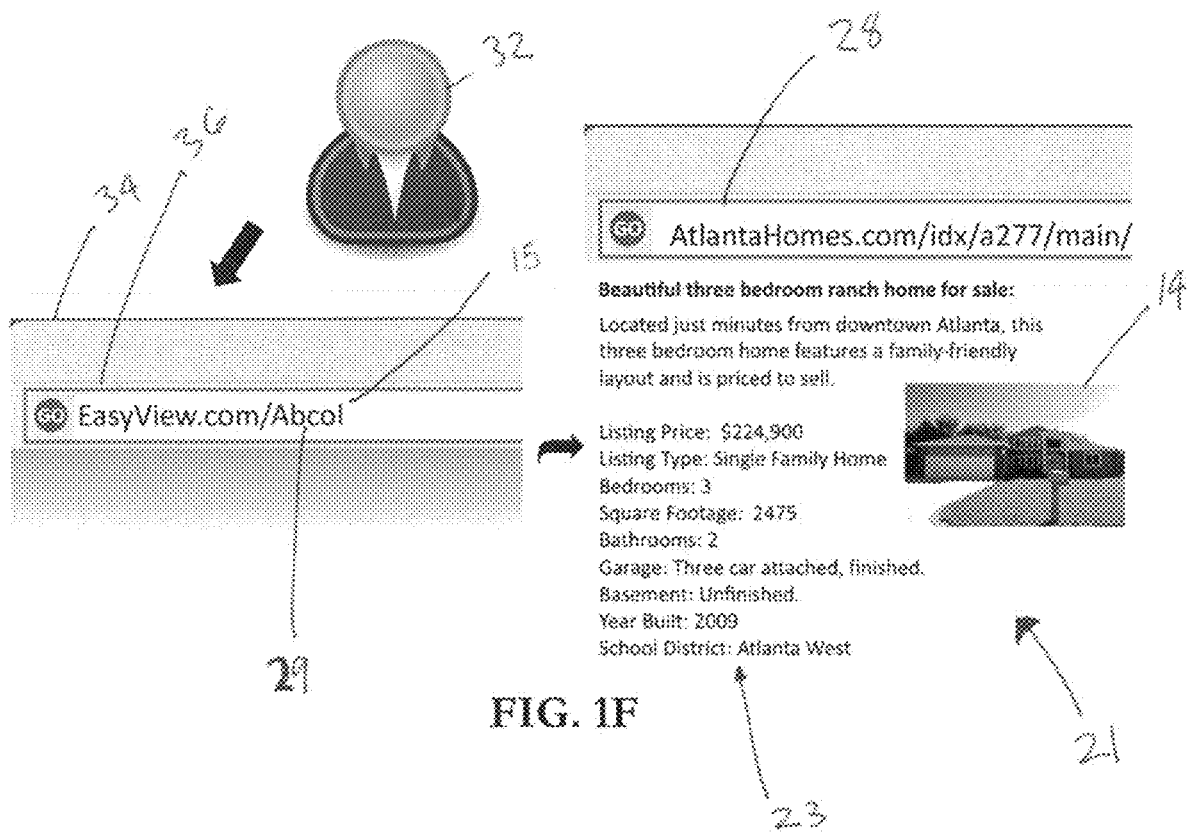
FIG. 1F depicts the embodiment of FIG. 1E, wherein a commercial user inputs the short URL.

As is shown in FIG. 1E, in exemplary embodiments, a commercial user 12 is able to use the signaler manager 102 to assign a signaler (shown at 1) to a target URL 28. In these embodiments, a pull-down menu 1A can be used to associate the signaler 1 with the target domain, wherein the pull-down menu 1A depicts a visual representation of all or a portion of the short URL 15. As is shown in FIG. 1F, when a prospective purchaser 32 enters the short URL 15 into a browser 36 on their mobile device 34, the prospective purchaser 32 is automatically redirected to the target URL 28. In the depicted embodiment, the target URL further comprises a webpage 21 comprising a variety of information 23 about the asset 14. Importantly, in FIG. 1F, the entered URL 29 is not identical to the short URL 15, but is interpreted as identical by the system by way of character and case-sensitivity disambiguation processes.

In FIG. 2A, following the sale of a first asset 14A, the commercial user 12 is then able to remove the signaler 1 from the proximity of the first asset 14A and re-associate it with a second asset 14B. In exemplary embodiments, the rider 18, such as a short URL 15, and beacon 20 are still associated with one another in the database 220, and can be re-assigned to the second asset 14B and corresponding second target URL 28B. In so doing, the commercial user 12 is able to re-use the same signaler 1 (sign 16, rider 18 and beacon 20) to associate with a second asset 14B and second target URL 28B. The process of FIGS. 4-6 is then repeated as to the second asset 14B for a new group of prospective purchasers 32B, 32C, 32D, 32E.

As is shown in FIG. 2B-2C, a commercial user 12 and their colleagues 12A can also be given access to various lead information 42 associated with various prospective purchasers 32B, 32C, 32D, 32E who have viewed a target URL 28 or asset 14. In certain embodiments, deep analytics 46 showing usage by operations system 44A, time of day 44B, location 44C, time 44D and other known metrics can also be collected. As is shown in FIG. 2D, and discussed in relation to FIG. 4C, the system 10 can comprise an advertising platform 300 and be capable of generating an advertising campaign 302 to produce further advertisements such as on social media and in newsprint, based on the listings and analytics, as would be apparent to one of skill in the art.

Figure 3A:
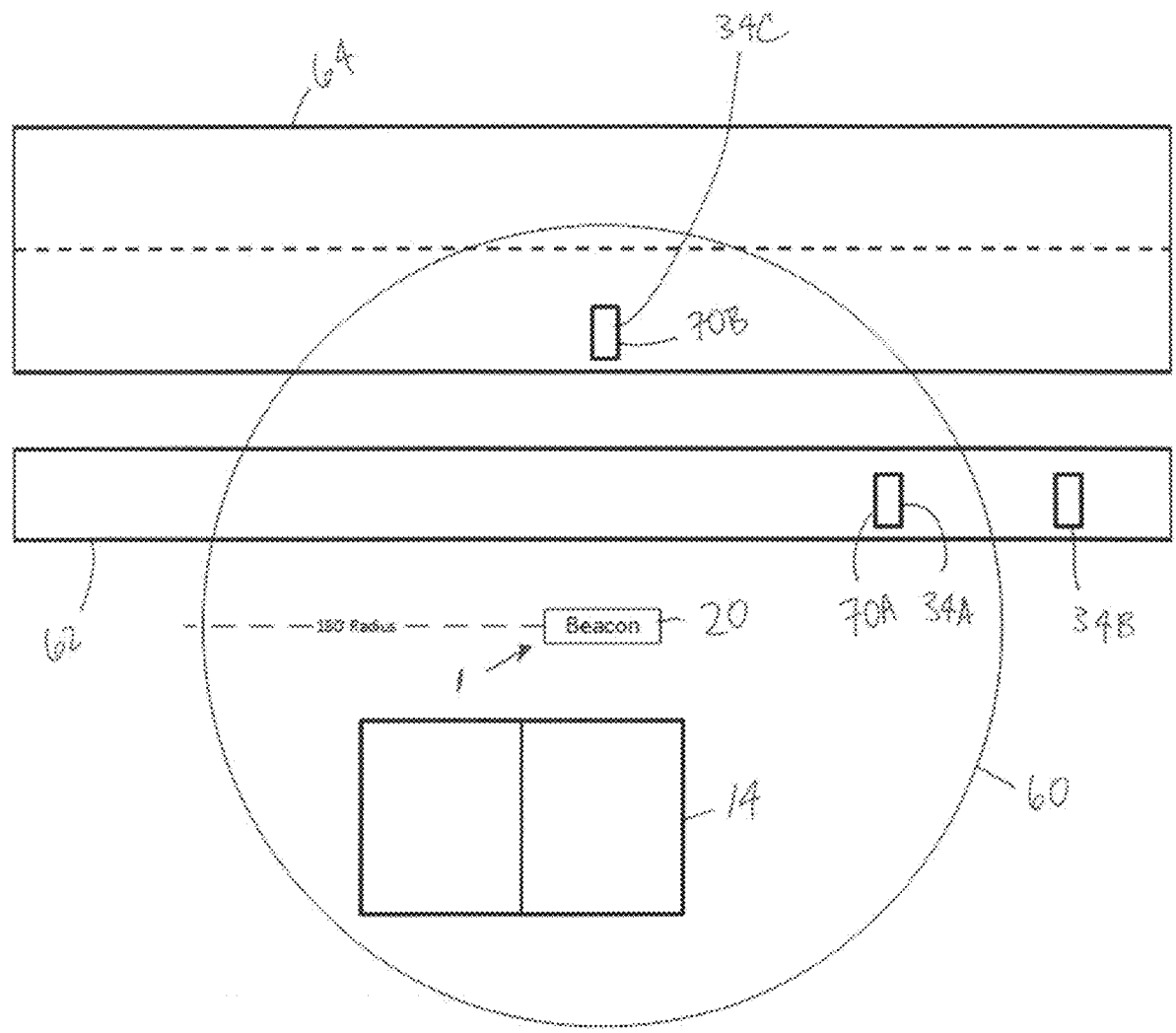
FIG. 3A depicts a top view of the system showing wireless communicator detection, according to an exemplary embodiment.

FIG. 3A depicts an exemplary view of beacon detection. As shown, a beacon 20 comprises a range 60, such as 180 feet. Within that range 60, such as on a sidewalk 62, a user device 34A, can recognize the beacon 20 signal, while a user device 34B outside the range 60, will not recognize the beacon 20. Thus, when the beacon 20 is placed within a range 60 of an asset 14, nearby devices 34A will be able to associate the beacon 20, and therefore the signaler 1 and target URL 28 with the asset by way of the system 10. In certain implementations, the range of a beacon 20 is approximately 180 feet or more.

Exemplary embodiments of the system 10 further comprise a dwell time 70A, 70B feature. In these embodiments, when a prospective purchaser 32, commercial user 12 or other party, such as a homeowner, comes into range of a beacon 20, that user's device 34A is able to detect the presence of the beacon 20 after a certain dwell time 70A has elapsed.

Continuing with FIG. 3A, in these embodiments, dwell time 70A, 70B can be utilized to mitigate false positive results, so that the user is not notified unintentionally. For example, a device 34C held by someone in a car driving on the road 64 by an asset 14, or many assets, can pass within the range 60 and not be notified due to insufficient dwell time 70B. Further, in certain implementations, specific users such as homeowners and real estate agents are able to ignore notifications, and to prevent repeat notifications when spending long periods of time in and around an asset 14. Accordingly, in certain implementations the dwell time 70A, 70B can have beginning and end times, therefore permitting notifications during a specific range of durations.

In one implementation, dwell time can be configured by the user for anywhere from 5 seconds to 120 seconds. In certain implementations, 15 seconds can be used to avoid false-positives for users driving by in residential areas. As would be apparent to one of skill in the art, other configurations and times will be suited for various beacon ranges.

Continuing with FIG. 3A, in these embodiments, users can acknowledge or ignore the notification. Users that acknowledge or open the notification will be taken to the real estate listing information. Users will not be given another notification of that beacon until the user or purchaser has exited and re-entered the range 60, also accounting for dwell time 70. Further discussion of the interaction between purchasers 32, users 12 and beacons can be found in relation to FIGS. 9A-B.

Returning to the system 10 as a whole, exemplary embodiments redirect a short URL 15 query to the system 10 server 200 and database 220 to check for a link or association with a target URL 28. If a signaler 1 to target URL 28 association is found, the system informs the querying device 34 or computer 120 and the purchaser 32 is redirected to the target URL 28 automatically. FIGS. 3B-3E depict various implementations of these aspects of the system.

Figure 3B:
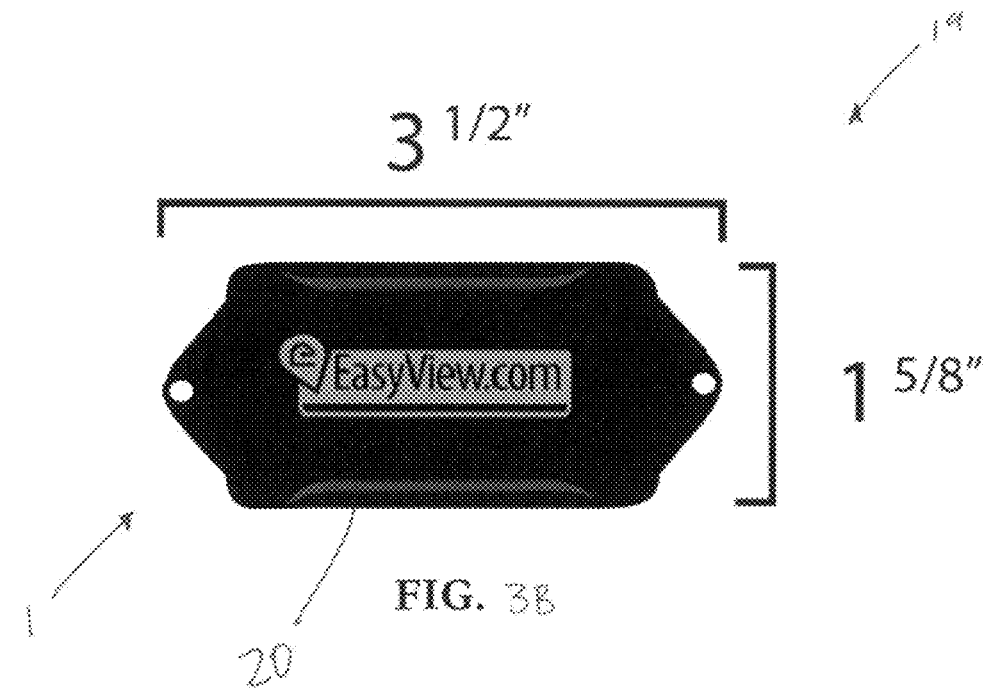
FIG. 3B depicts a front view of an embodiment of a signaler comprising a wireless communicator.
Figure 3C:
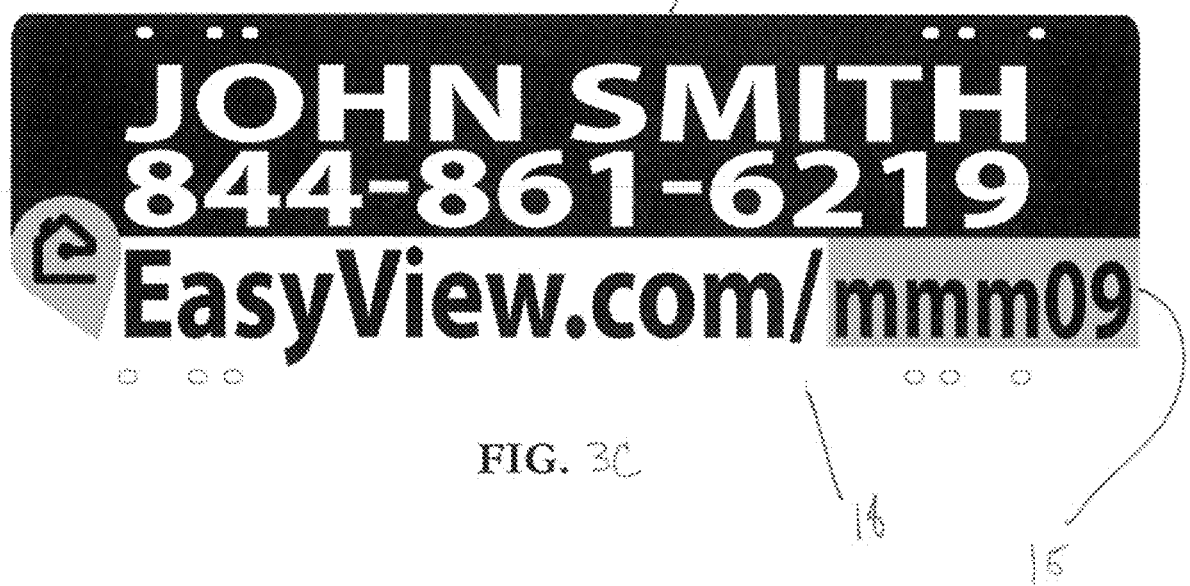
FIG. 3C depicts a front view of an embodiment of a signaler comprising a sign and short URL.

In FIG. 3B, an embodiment of a signaler 1 comprising a beacon 20 is depicted. In FIG. 3C, an exemplary combined sign 16 and rider 18 is depicted, further comprising a short URL 15. In certain embodiments, the embodiments of FIGS. 3B and 3C could be combined, so as to couple a beacon 20 with a rider, though this is not necessary, as either embodiment alone can provide the necessary notification functionality of the system.

While real estate sales have been the examples described in relation to FIGS. 1A-3C and 4A-14, other embodiments are possible. For example, in FIG. 3D, an embodiment is depicted in use with a target URL 128 linking to a webpage 121 containing information 123 about the automobile. In this embodiment, a commercial user 112, such as an auto manufacturer, is able to use a signaler 101 comprising a sign 116 and a short URL 115 for association with an individual automobile. In this embodiment, for example, the signaler 101 can be installed directly into the automobile, such as on a vehicle identification number ("VIN") sticker 101A. Typically, the VIN sticker is permanently attached to the automobile so it is important for the auto manufacturer to be able to map this short URL 115 printed on the VIN sticker to information on this vehicle over long periods of time. If the auto maker's website is changed, this short URL 115 can be re-mapped to a new target URL so that anyone viewing the sticker (printed years earlier) is still automatically connected to the appropriate information.

Figure 3D:
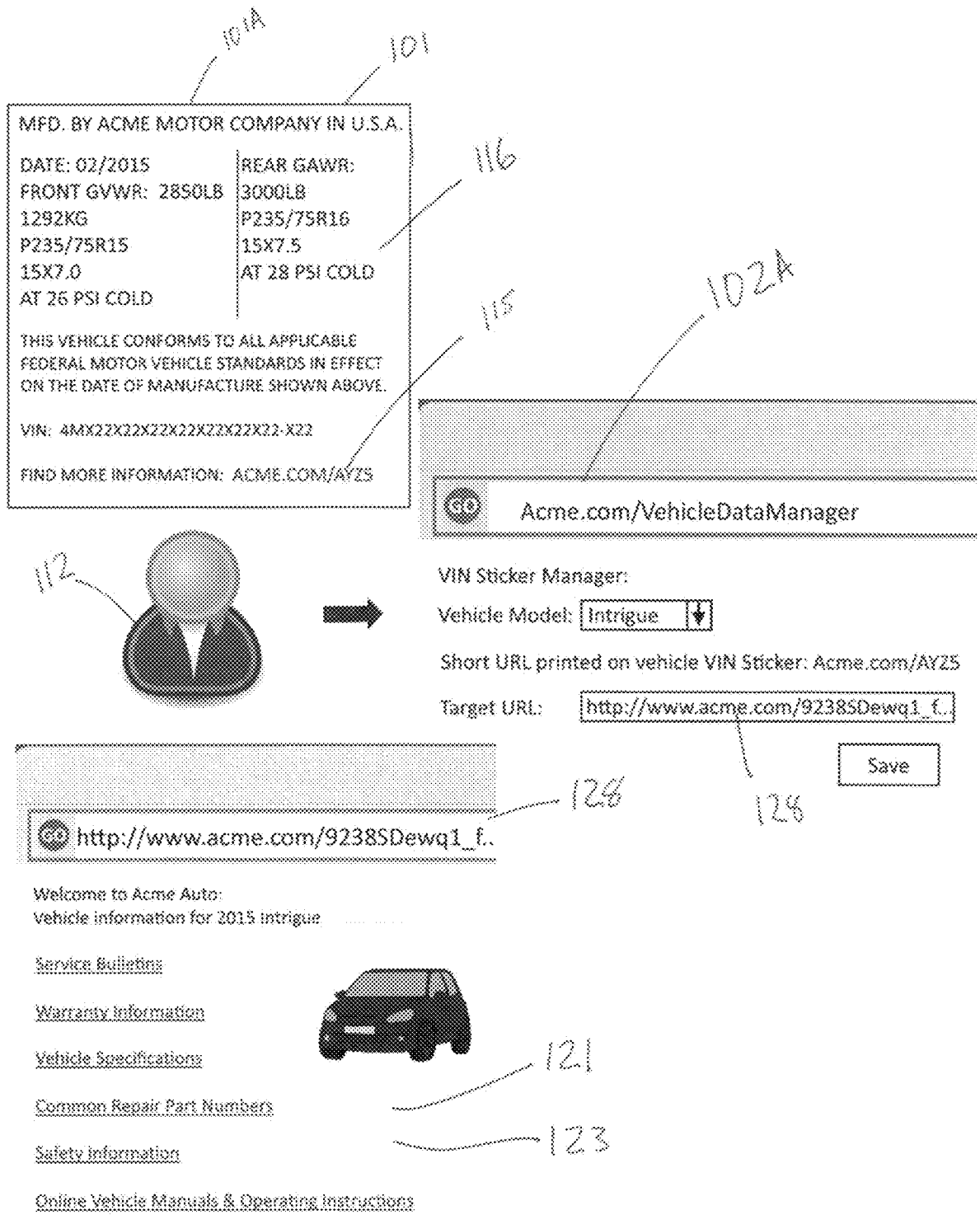
FIG. 3D depicts a schematic of the system in use with a target URL linking to a webpage containing information about an automobile, according to an alternative embodiment.

Continuing with FIG. 3D, this signaler is thus useful for the eventual purchaser, mechanic, insurance company, and potentially subsequent purchasers, as it can quickly and easily direct them to a target URL 128. In this embodiment, the commercial user 112 is able to thus able associate the individual automobile with a target URL 128 linking to a webpage 121 containing information 123 about the automobile. The commercial user is able to link the signaler 101 with the target URL 128 by way of the web dashboard 102A. In certain embodiments, a beacon (not shown) can also be provided.

Figure 3E:
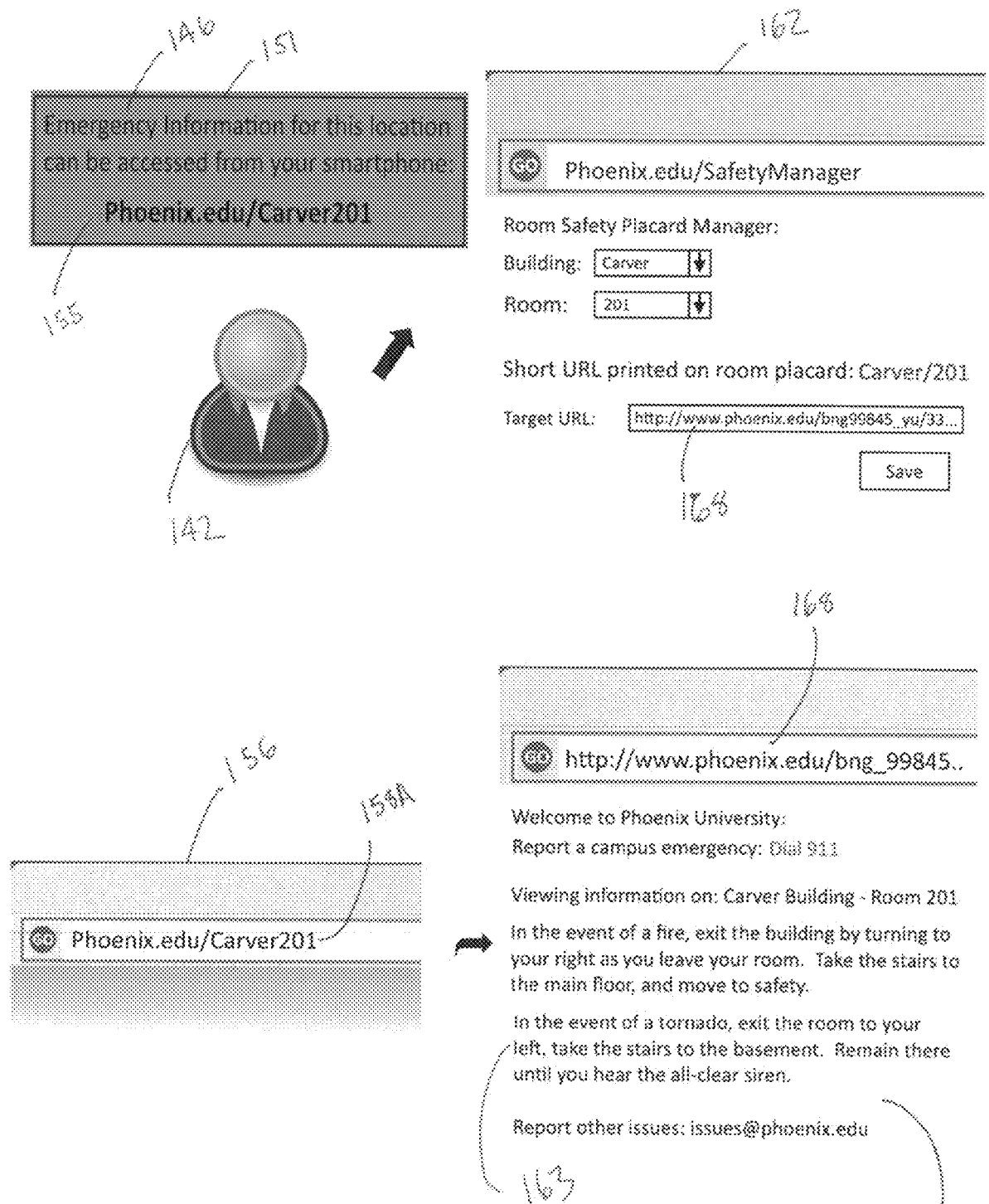
FIG. 3E depicts a schematic of the system in use with a target URL linking to a webpage containing information about a location, according to an alternative embodiment.

As is shown in FIG. 3E, in certain embodiments the system 10 can be used to allow an individual to obtain information about their location. This can provide contextual information such as a map or emergency instructions. As shown in FIG. 3E, an institutional user 142 is able to place a signaler 151 comprising a sign 146 and a short URL 155 for association with a location. In exemplary embodiments, the signaler 151 can be a placard, and can comprise a beacon. The placard is permanently attached to the building, so it is important for the University to be able to map this short URL 155 printed on the room placard to information on this classroom over long periods of time. If the website is changed, this short URL 155 can be re-mapped to a new target URL so that anyone viewing the placard (printed years earlier) is still automatically connected to the appropriate information.

These embodiments further comprise the ability to associate the signaler 151 with a target URL 168 linking to a webpage 161 containing information 163 about the location by way of a sign manger 162. Further implementations are possible, as would be apparent to one of skill in the art.

As is shown in FIGS. 4A-D, in various embodiments, several connections can occur between the various aspects of the system, such as between the commercial user 12, the server 200, the database 220, the purchaser's device 34 and/or computer 120. These connections allow for client-to-server communications, including with the system's 10 mobile application 40. In these embodiments, a client 51 can be any device in which data from the system server 200, 242 and/or database 220 is transmitted, such as a device 34 or computer 120 and the like. These various connections can include a web browser 36 connection, a mobile application 40 connection, a mobile API 52 connection, a server connection in the case of server-to-server communication by the customer domain connection 245, or combinations thereof.

For example, the system may comprise a mobile application 40 comprising a mobile API 52, which will serve as the connection between the mobile device 34 and the server 200. In this embodiment, the mobile API 52 allows the device 34 to request 232 with the server 200 and database 220 by way of the internet 110. As such, the purchaser 32 is able to enter the short URL 15 from the signaler 1 into the mobile application 40 and the target URL 28 associated with that signaler's 1 asset is automatically provided to the purchaser 32 within the mobile application 40 or on the device's browser 36.

Figure 4A:
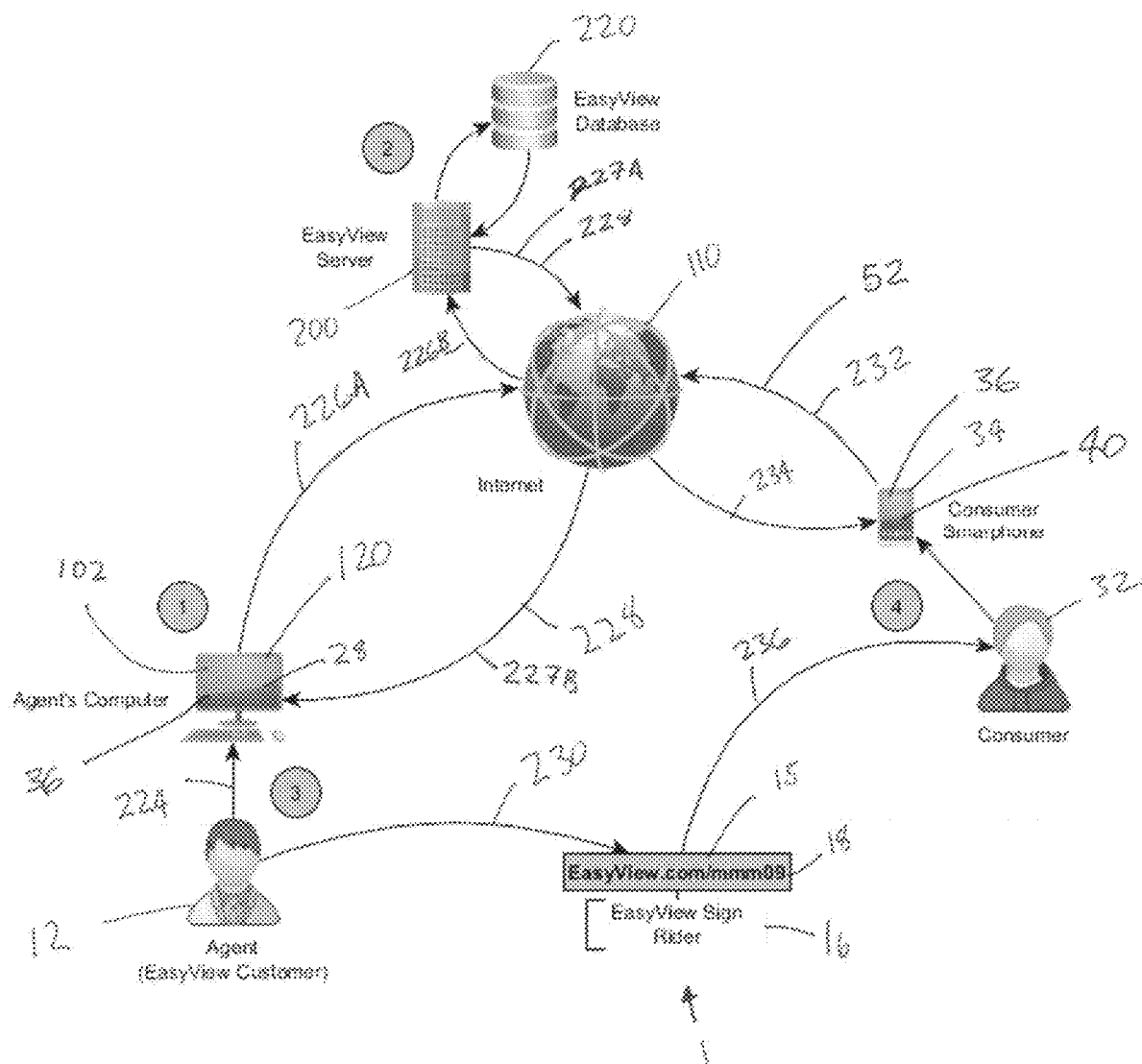
FIG. 4A is a network schematic of an exemplary embodiment of the system.

FIG. 4A depicts a schematic overview of the system 10, linking a sign 16 to an asset 14 target URL 28 after the signaler has been associated with an asset (shown at 230). To demonstrate an exemplary implementation, the following steps can be performed. First, a commercial user 12 logs into the system 10 software 100 using a device or computer 120 to access the signaler manager 102 and create or link the target URL 28, designated by 224. In this embodiment, the software 100A is connected to the internet 110, which is in communication with a database 220 by way of a server 200, such that the computer 120 is in electronic communication with the database 220. This commercial user connection 226A, 226B, can be performed by way of an API, through a browser connection to the internet 110, or other forms of internet connection. In these embodiments, the server 200 communicates to the commercial user 12 a response 228 that the data was saved in the database 220 (shown at 228). This response 228 is within the device 34 browser 36.

Figure 4B:
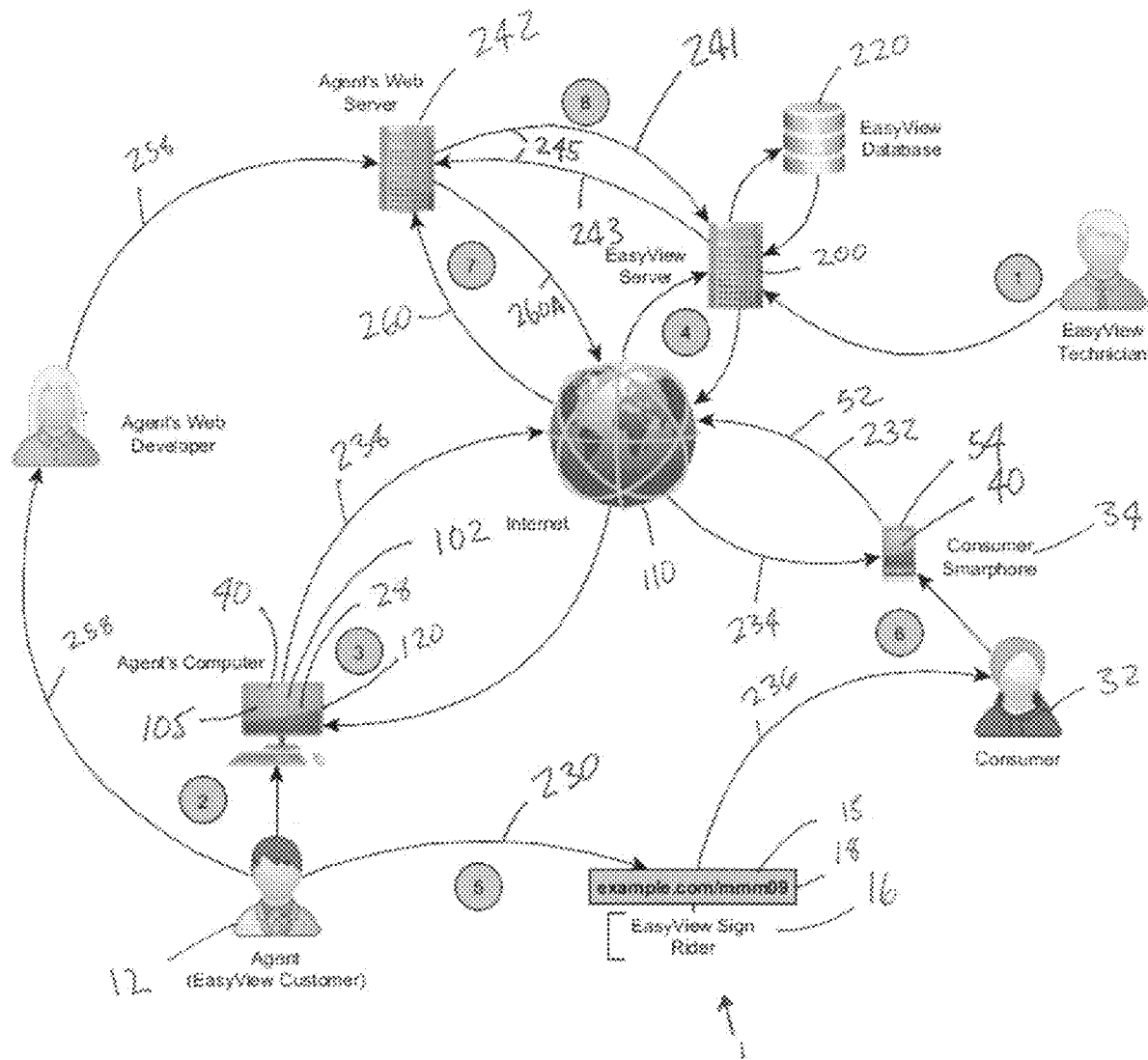
FIG. 4B is a network schematic of another exemplary embodiment of the system.

As is shown in FIG. 4B, in certain implementations, a third party server 242 can be provided. In these embodiments, when a purchaser 32 is exposed to a signaler 1 (shown at 236) and desires information about the underlying asset by way of their device 34, the purchaser 32 enters the custom domain 250 into their device.

In these embodiments, following the entry of a short URL 15 into a mobile device 34, the third party server 242 can receive a lookup request (shown at 260) but does not resolve to a URL on the third party server 242. Instead, the third party server 242 sends a request 241 to the system server 200 to query the system database for an association between the short URL 15 and target URL 28. In various embodiments, when a purchaser 32 is exposed to a signaler 1, sign 16, rider 18, and/or beacon 20 (shown at 236) and desires information about the underlying asset by way of their device 34 based on a short URL 15, the mobile connection, such as a mobile API 52, initiates a client request 232, the server 200 receives the request 232. The server 200 then looks up the target URL 28 on the database 220, and sends the purchaser 32 a response featuring the target URL 28 information, as shown at the response 234.

In these embodiments, if the system 10 recognizes the short URL 15 as a valid URL (meaning that it is currently associated with a specific target URL), the system retrieves the target URL 28 information and initiates a response 243 to the third party server 242 with information on where to redirect the user 12, prospective purchaser 32, or any other person that initiates the request 232. This information is then communicated from the third party server 242 to the prospective purchaser 32 device 34 as a redirect to the target URL 28. If an association is not found, a not found error is returned. In certain embodiments, and as discussed further in relation to FIGS. 5A-C, the request will be based on a custom domain 250 with the custom domain 250 URL information the user entered into their mobile device 34.

The commercial user 12 is able to log into the system 10, for example by way of software 100 comprising a signaler manager 102. The commercial user 12 can manage the system, such as by the signaler manager 102, by direct entry into the third party server 242 online 238, or have it entered directly/manually 240, as shown at 258. In certain implementations, an SDK and/or credentials may be utilized to allow the third party server 242 to communicate with the custom domain API to lookup short URLs 15 recognized by the system 10 server 200 database 220, as is explained further in relation to FIG. 5C.

Further, a third party API may also be provided to serve as the third party connection 54 between the device 34 or computer 120 with a third party server 242, which is in communication with the server 200 and database 220. This third party API may feature the access functionality of the mobile API 52, but comprise material specific to the commercial user's 12 business, such as branding and the like.

Figure 4C:
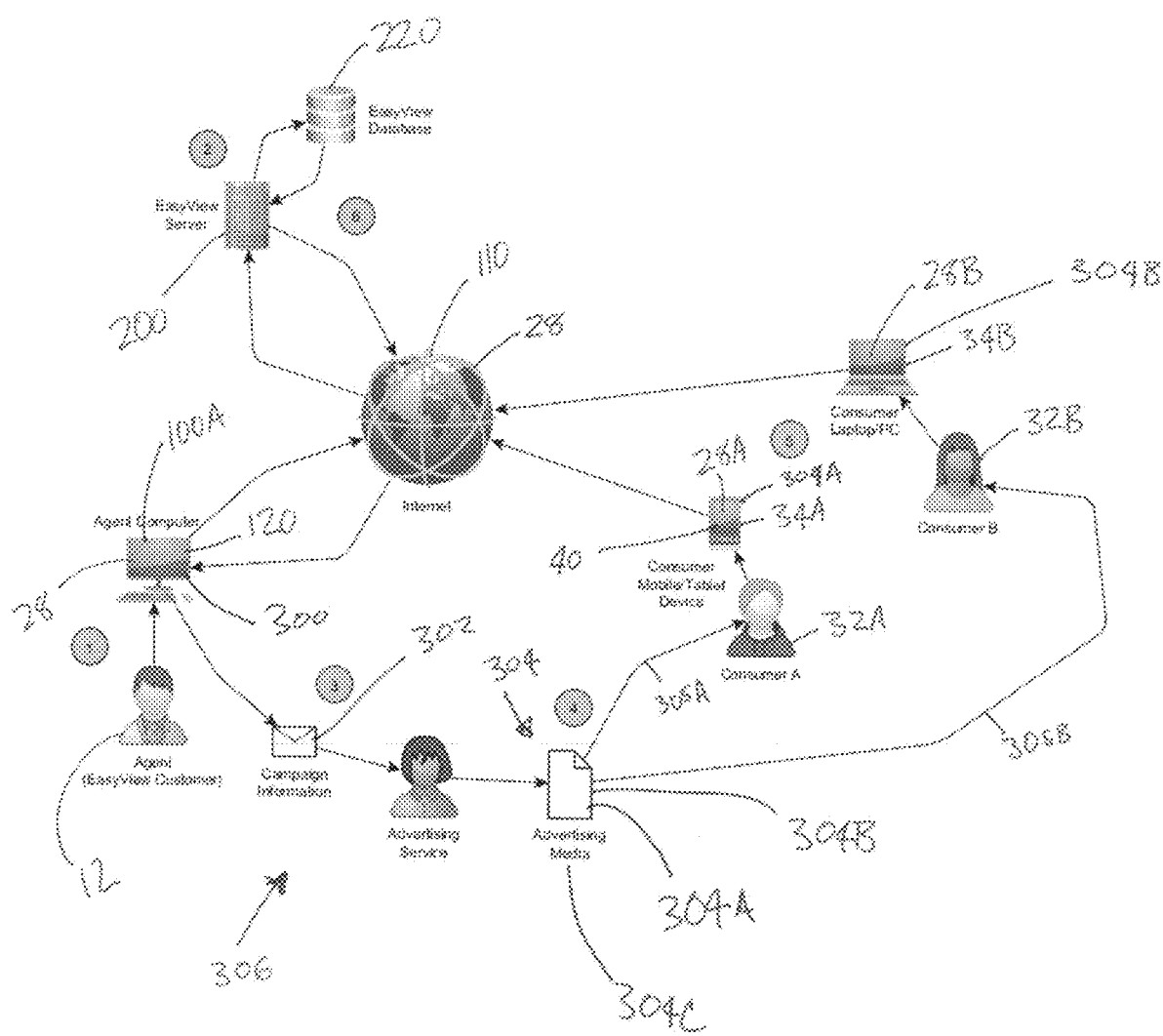
FIG. 4C is a network schematic of yet another exemplary embodiment of the system.

FIG. 4C depicts various aspects of an implementation of the system 10 software 100C further comprising an advertising platform 300. In these implementations, a commercial user 12 can use the advertising platform 300 to create an individual advertising campaign 302. The commercial user 12 may enter information about how the advertising campaign 302 will be used and which asset 14 or assets will be included in the advertising campaign 302.

In various implementations, the advertising platform 300 will assign each listing a unique identifier 304. This unique identifier 304 is held active for the duration of the advertising campaign 302 and will identify the target URL 28 and the advertising campaign 302. The advertising platform 300 thus provides the commercial user 12 with each asset's 14 respective unique identifier 304.

In these implementations, the commercial user 12 can send the target URL 28 information 28A, including the unique identifier 304, to an advertising system 306. The advertising system 306 may advertise in tangible media (e.g. newspaper, billboard, magazine) or intangible media (e.g. internet ad, radio, television). In exemplary embodiments, one asset 14 can be therefore associated with several distinct short URLs 304A, 304B, 304C, such that the system 10 can determine the advertising source that the purchaser 32A, 32B used. For example, easyview.com/MM1 easyview.com/MM2 and easyview.com/MM3 may all be associated with a single asset, but used in various advertising platforms, for example a newspaper, a billboard and Facebook, respectively, such that the system 10 is able to determine that a prospective purchaser 32 that enters the MM2 short URL 304B is identified as having been reached by the billboard. Again, in each of these embodiments, the short URLs 304A, 304B, 304C may also be re-used.

Figure 4D:
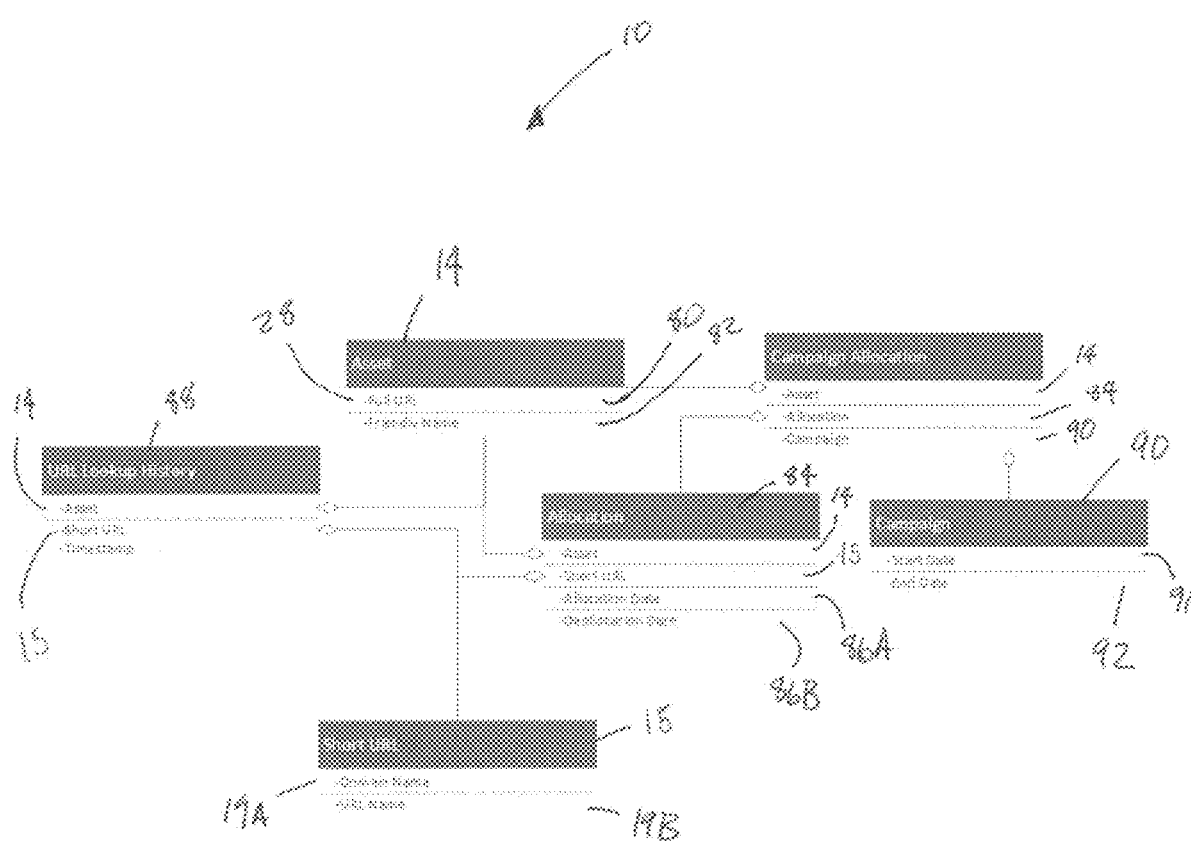
FIG. 4D is a system diagram of various data relationships and features in an exemplary implementation of the system.

FIG. 4D depicts a system diagram of exemplary data relationships and features in an exemplary implementation of the system 10, which include could management capabilities. In exemplary embodiments of the system 10, an asset 14 represents a physical entity that will be associated with a signaler 1. Within the system 10 an asset 14 must be associated with target URL 28, and may contain much more asset information, but should minimally include a full URL 80. A "friendly name" 82 can also be included for management purposes, but is not required. In various embodiments, a short URL 15 is a domain 19A and URL 19B combination that can be resolved to a longer, full URL 80 by the system 10. An allocation 84 indicates a connection between an asset 14 and signaler 1 such as a sign or code generated from an advertising campaign. Each allocation 84 can comprise allocation date 86A and deallocation date 86B, which can be used to determine the timeframe in which the asset 14 and target URL 28 were associated. In certain embodiments, if the database 220 shows that the deallocation 86B is set for a future date or is null, the association will be considered active, such that the redirection will occur in the system 10.

Certain embodiments of the system 10 feature a URL lookup history 88, which can document an individual purchaser's viewing of a short URL 15 and, subsequently, its related target URL 28. The lookup history 88 can include a timestamp of the viewing. In certain implementations, the lookup history 88 allows the allocation to be calculated by use of the allocation and deallocation dates of the allocation table. Alternatively, the URL lookup history can be connected to the allocation directly and the asset 14 and short URL 15 retrieved. A campaign 90 comprises a start date 91 and end date 92 and represents an advertisement campaign. It holds minimalistic information and is meant to be a container for other objects. A campaign allocation represents a link between an asset, a campaign, and an allocation. This allows the system 10 to utilize the URL lookup history 88 to determine which page views were related to various campaigns and identify the lookup history 88 related to a particular campaign 90 by various prospective purchasers 32A, 32B.

Figure 5A:
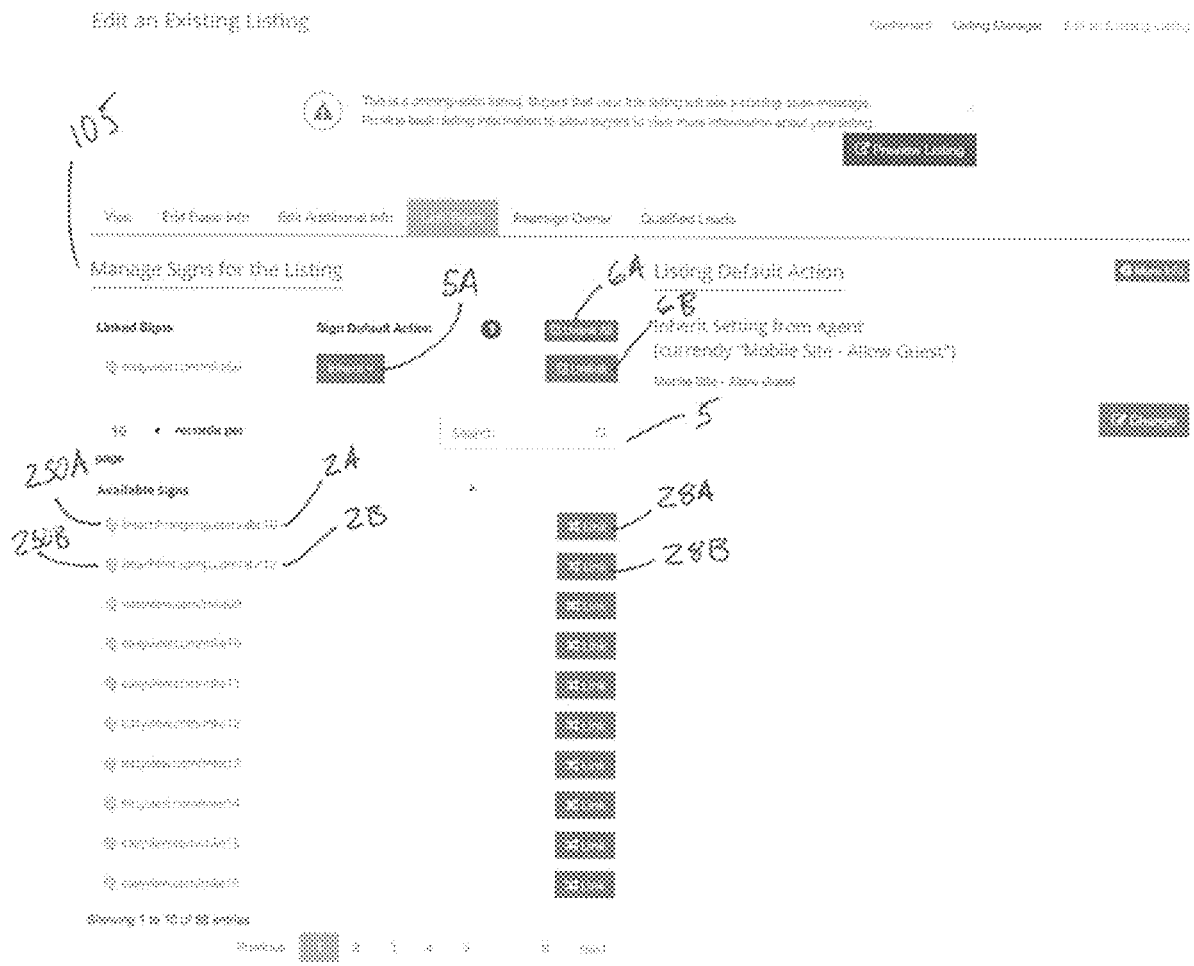
FIG. 5A is a screenshot view of an exemplary embodiment of the system comprising a short URL manager.
Figure 6:
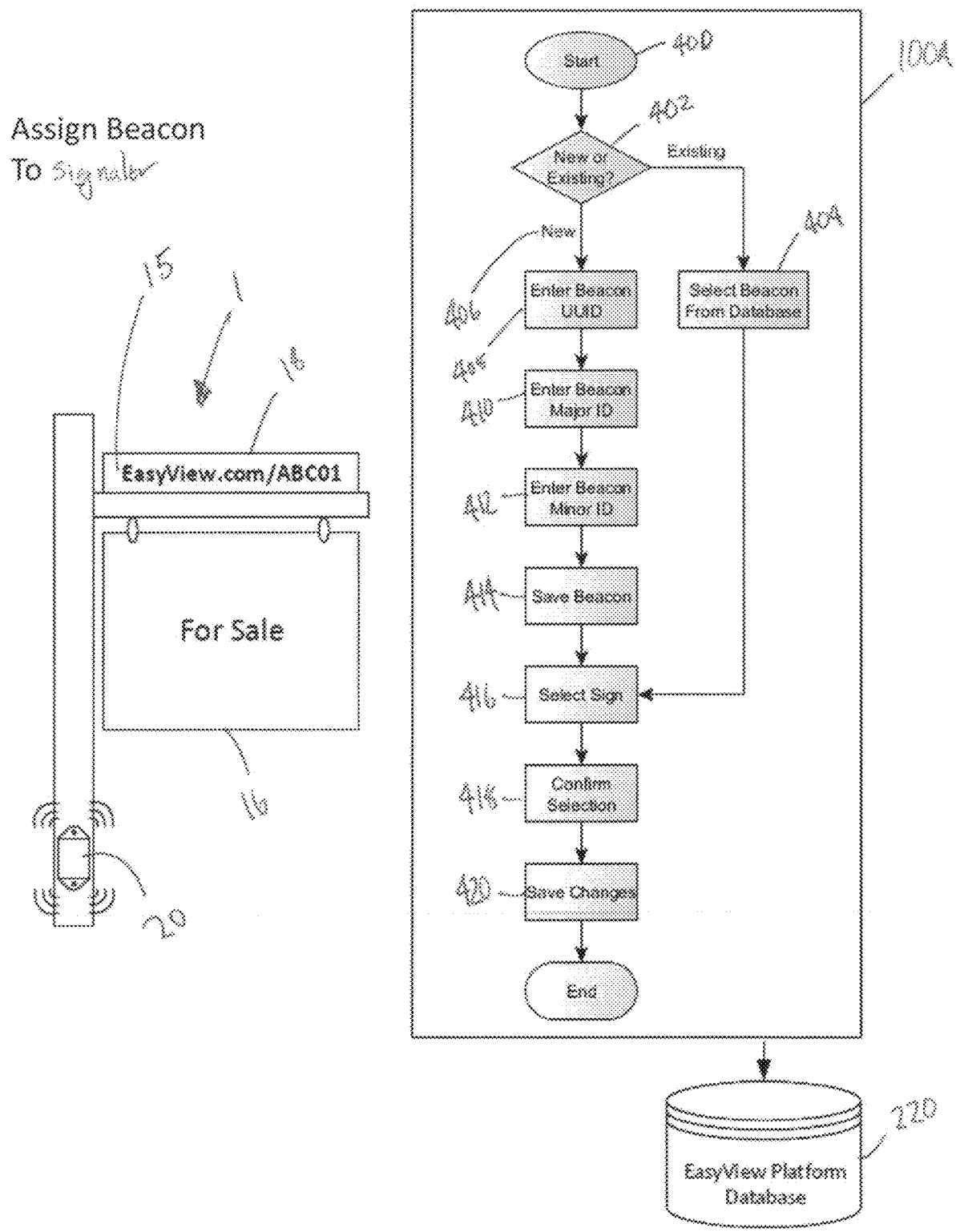
FIG. 6 depicts a flow chart of an exemplary process of the software workflow for assigning a wireless communicator to a signaler.

As is shown in FIG. 5A, in exemplary embodiments the system 10 can utilize custom domains 250 to redirect traffic.

Figure 5B:
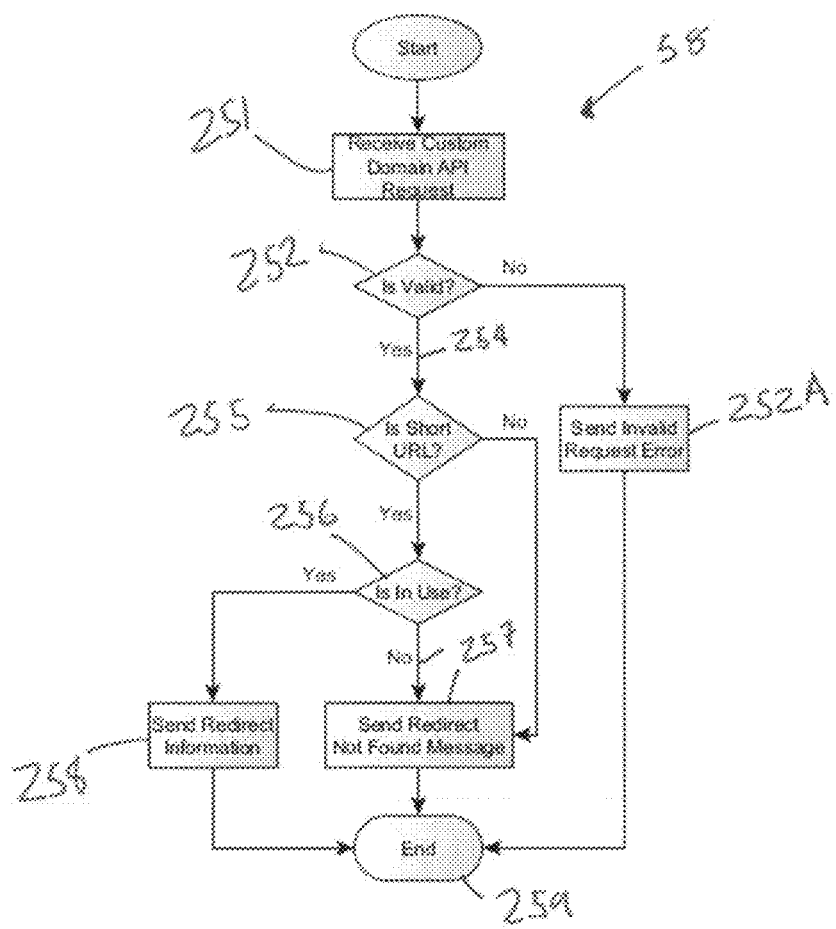
FIG. 5B is a flow chart showing the process of resolving a custom domain short URL to a target URL.

In these implementations, a custom domain 250 having a short URL comprising a third party company's name, or alluding to said company, can be used to redirect to the listing. The commercial user can utilize the custom domain manager 105, which may comprise a custom domain API 58 (as shown in FIG. 5B), to assign specific signalers 1 and short URLs 15 to target URLs 28A, 28B. In these embodiments, the custom domain manager 105 can allow for the use of custom domains 250 as short URLs.

For example, in certain embodiments, the custom domain 250 may be: www.beachfrontprop.comimm11. As would be apparent to one of skill in the art, there are certain marketing advantages implicit in using a company's own domains to advertise various assets. For example, this is applicable in settings involving real estate and automobile sales. Accordingly, in these implementations, the target URL 28 to which the purchaser 32 is directed are redirected by a custom domain 250A, 250B.

The commercial user 12 logs into the custom domain manager 105, using their computer 120. From the custom domain manager 105, the commercial user 12 may create a target URL 28 and link an existing signaler to their listing using a custom domain 250. For example, in certain embodiments, a custom domain 250 may be beachfrontprop.com. As would be apparent to one of skill in the art using the system 10, this custom domain 250 can then be used in conjunction with a short human readable code, such as /abc10 which identifies the specific signaler 1 within the system for the commercial user 12. The to-be linked signalers are designated at 2A, 2B each of which comprises a short URL 15 which is a custom domain 250A, 250B. For example, a These custom domains 250A, 250B can be assigned to specific assets 14 and target URLs 28A, 28B. A commercial user 12 may also select various other options from a menu 5, such as to inherit 5A characteristics from prior associations.

In these embodiments, the association between a custom domain 250 and target URL 28 is stored in the database 220. The commercial user 12 is therefore able to configure connections between signalers 1 comprising custom domains 250, specific assets 14 and target URLs 28A, 28B by way of the custom domain manager 105. The custom user can make the associations within the system database 220 by way of, for example, a custom domain connection (shown in FIG. 4B at 258), such that the associations are rather linked within the system database 220. In certain embodiments, this connection can be by way of a custom domain API, an online web platform, in-browser, and the like. In the implementation depicted, custom domain 250 information is added to the database 220 by way of a third party server 242, which transmits the information to the database 220. The commercial user 12 thereby has access to those custom domains 250 in the custom domain manager 105.

In various implementations, the system 10 can comprise a custom domain connection (shown at 245 in FIG. 4B) to facilitate server-to-server 200, 242 communication. This custom domain connection 245 allows the commercial user 12 to use of a short URL 15 on a commercial user's 12 web domain name. To illustrate, beachfrontprop.com/{short code} can be used instead of easyview.com/{short code}. In certain embodiments, this custom domain connection 245 is accessible with a valid custom domain API key.

Returning to FIG. 5A, the commercial user 12 can further unlink one 6B or more 6A signs using the custom domain manager 105. Accordingly, when a purchaser 32 initiates a database 220 query by entering a custom domain 250, the database 220 comprises a comprehensive listing of all such associations in real time, as the commercial user 12 is able to manage the associations as needed.

In use, a purchaser 32 enters the custom domain into their device 34, which is then queried to the database 220 by way of the third party server 242 and server 200. If an association with a target URL is found, that association is returned to the third party server 242 to redirect the purchaser 32 to the target URL 28. If the custom domain is not found, a not found error is returned by the database, thereby triggering an error on the purchaser device 34.

In FIG. 5B, the process of resolving a short URL by way of a custom domain API 58 is shown, wherein the short URL is using a custom domain. In these embodiments, the custom domain API request 251 is validated by the server (box 252). If invalid 253, the process is terminated 259. If the request is valid 254, the server assesses if the request contains a short URL (box 255) which is used (box 256) in the database. If it is in use, meaning associated in the database 220 the server 200 issues a redirect notice (box 258). If it is not in use, a not found notice is dispatched (box 257), and the process is terminated (box 259).

Figure 5C:
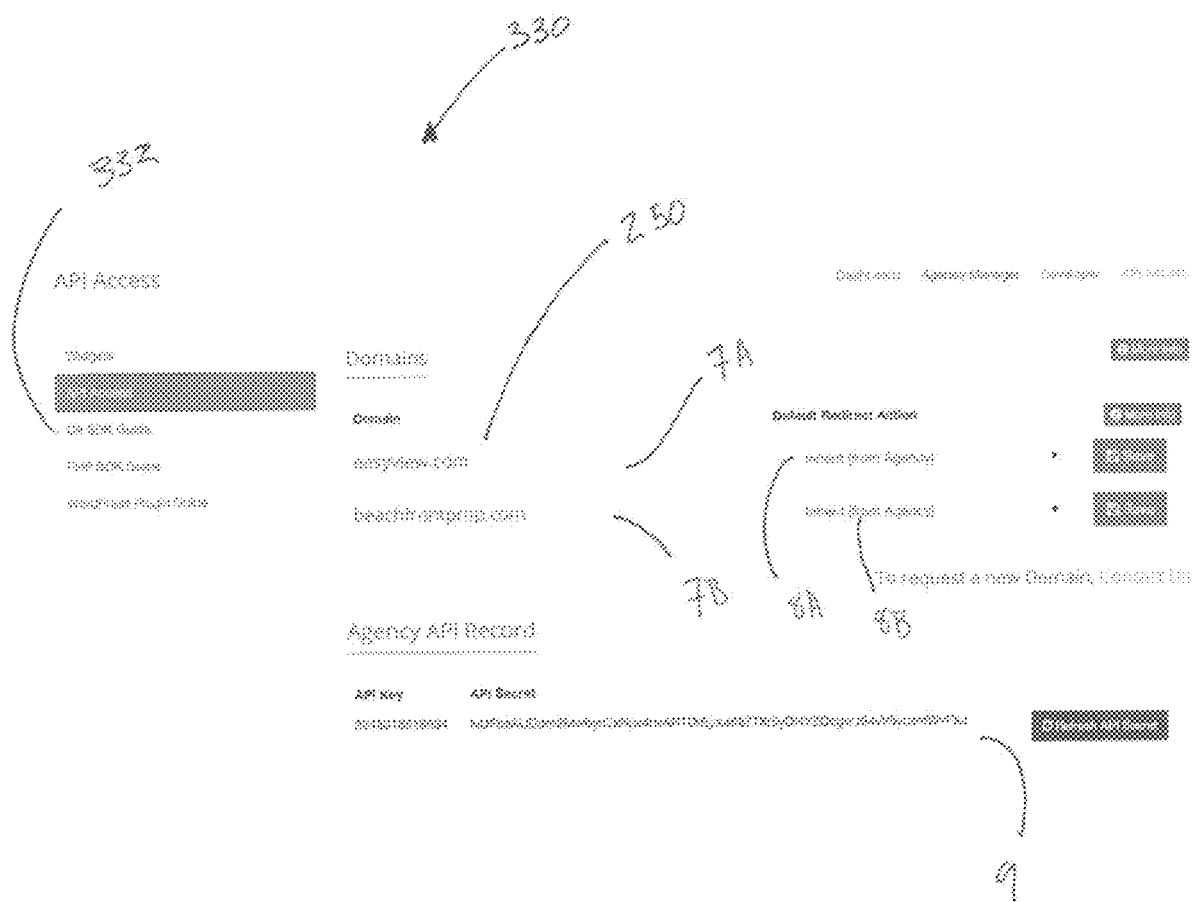
FIG. 5C is a screenshot view of an exemplary embodiment of the system comprising a custom domain manager and software development kit.

As shown in FIG. 5C, in exemplary embodiments, the system 10 comprises a custom domain software development kit ("SDK") 330, which can provide a set of development tools 332 provided to a third party to allow creation of software which interacts with the custom domain API 58, as one skilled in the art would readily appreciate. Accordingly, individual commercial users 12 are able to tailor their use of the custom domain API 58, such as by creating a list of possible short URLs using the commercial user's 12 domain so as to reduce the number of requests to the custom domain API 58. The user can further establish rules for custom domains 250 such that each domain 7A, 7B can be given specific default redirect actions 8A, 8B. An agency API record 9 can also be viewed with the API key 9 and API secret 9. Again, analytics and information on the buyer can be collected by the software 100, and are automatically associated with the asset 14 and prospective purchaser 32.

Turning to the assignment of the individual components of the signaler 1, FIGS. 6-14 depict various exemplary implementations relating to the association of various signaler 1 components, such as the short URL 15 and beacon 20 with one another and the asset 14. In certain of these descriptions, the sign 16 is used as the proxy for the signaler 1, and is not intended to limit the scope of the disclosed devices, systems and methods. For example, when a beacon 20 is connected to a signaler 1, that beacon 20 is therefore transitively connected to whichever asset 14, short URL 15, target URL 28, rider 18 and sign 16 the signaler 1 is also connected to.

FIG. 6 depicts an exemplary process of a software workflow 100A for assigning a beacon 20 to the signaler 1. In exemplary embodiments, the beacons 20 contain at least three identifying pieces of information: the Universal Unique Identifier ("UUID"), the major ID and the minor ID. In these embodiments, the UUID is a value that indicates the beacon is part of, and associated with, the system 10 as a whole. This value is used by the operations system of devices that can detect beacons to determine which application that beacon is related to. The major and minor IDs are separate values that together create a unique identifier for that beacon. The system utilizes the major and minor IDs to identify specific beacons 20.

Continuing with FIG. 6, the beacon 20 is assigned to a signaler 1 by proceeding through the following steps. In an exemplary embodiment, a purchaser enters information into the software workflow 100A by way of a computer or other device using a graphical purchaser interface or other input system, represented at 400. In the depicted embodiment, the purchaser indicates whether or not a beacon is a new beacon or an existing beacon, as is shown in box 402. If the beacon 20 is already in the database 220, the purchaser indicates which existing beacon 20 is to be assigned at box 404.

In various embodiments, the electronic wireless communicator, or beacon 20 can be a radio-frequency identification ("RFID") tag, a near field communication ("NFC"), geofences, GPS triggered data, Other Apple iBeacon Hardware Vendors, Google Eddystone, Wi-Fi Captive Portal, a variety of devices that transfer data with audio, such as Chirp and Signal360 and Arduino Beacons. Other beacons 20 are possible, as would be apparent to one of skill in the art.

Returning to FIG. 6, if the beacon 20 is "new," meaning not previously assigned within the system 10, and as designated by 406, the user enters the UUID (box 408), the major ID (box 410) and minor ID (box 412). The beacon is then saved into the system 10 (box 414), and associated with a sign 16 (box 416).

In certain embodiments, the association can then be confirmed (box 418) and saved (box 420), such that the beacon 20 and signaler 1 are now associated with one another in the system 10 database 220. After confirming the selection, the association is saved in the database 220 such that any lookup or query to the database will associate both the signaler 1 and beacon.

Figure 7:
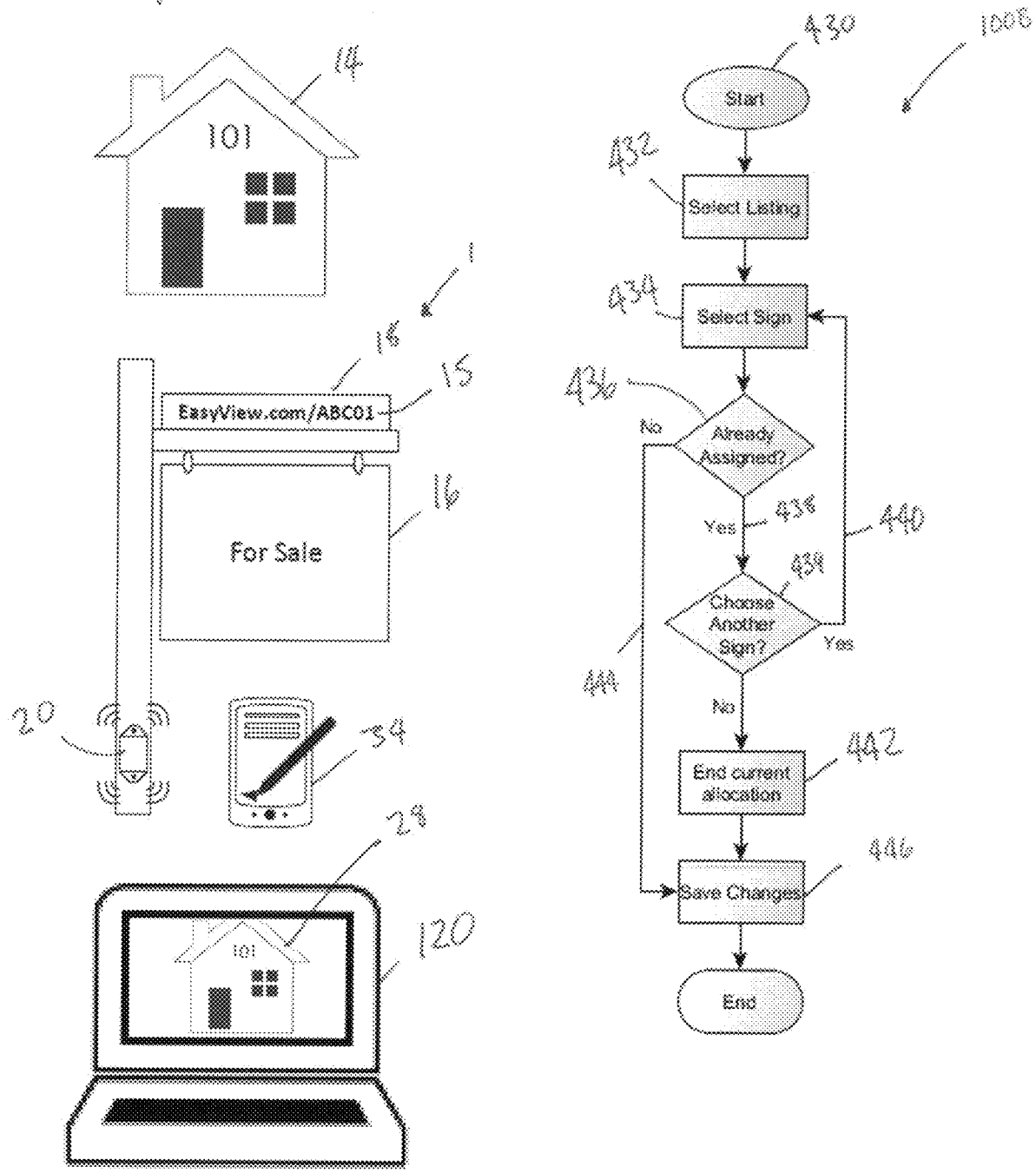
FIG. 7 shows an exemplary schematic and flow chart of the assignment of a signaler and beacon to a specific target URL within the system.

FIG. 7 shows the assignment of a signaler 1 and a beacon 20 to a specific target URL 28 within a software platform 100B. To assign a sign 16 to a target URL 28, the purchaser interacts with their device (box 430), and selects the listing (box 432) and a signaler 1 (box 434). In certain implementations, this can be performed in the reverse order, or simultaneously within the computer 120 or device 34.

In either case, the software platform 100B will then check the database 220 to determine if the signaler 1 is associated with another listing (box 436). If the sign 16 is already assigned (438), the purchaser must either select (box 439) a different sign (line 440) or override the existing assignment, link or connection (box 442) between the assets and target URL. If it is not assigned (line 444), or if the purchaser will override (box 442), the assignment of the signaler 1 to the target URL 28 can then be saved in the database 220 (box 446).

Figure 8:
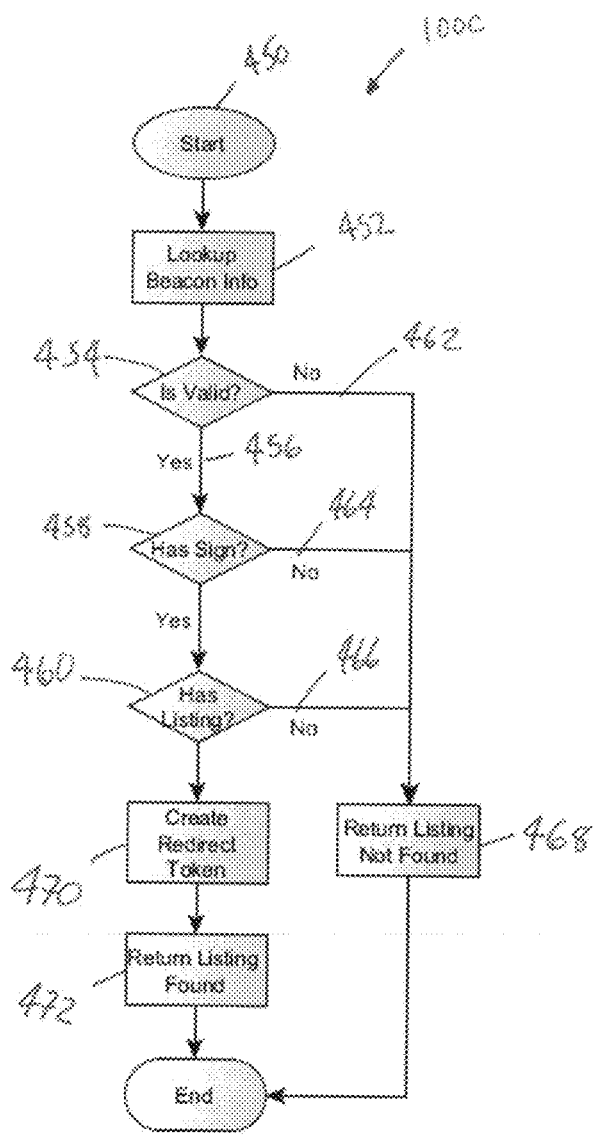
FIG. 8 depicts a flow chart of an implementation of the system software comprising server beacon listing lookup workflow software.

FIG. 8 depicts an implementation of the system 10 software 100C comprising a server beacon listing lookup workflow software 100C. The initiation of such a beacon lookup occurs when an enabled device 34 is brought into proximity of a beacon 20 (box 450, also shown in FIG. 9). For example, FIG. 9 illustrates the system 10 workflow when a Bluetooth-enabled device 34 detects a beacon 20. In various implementations, when the system server 200 receives a beacon listing lookup request 452, the server 200 will query the current beacon information. The request must include the beacon's UUID, major ID, and minor ID. The UUID identifies the beacon as a system component, while the major and minor IDs allow the server to locate the beacon 20 in the database 220 (box 454). If the specific beacon 20 is already logged in the database 220 (line 456), the server 200 checks if it is associated with a signaler 1 (box 458). If it is connected to a signaler 1 and that signaler 1 is connected to a listing (box 460), the server will send a response indicating the listing information was found and provide a redirect token (box 470). Further discussion of the token system is found in relation to FIG. 12. In the event an association is not found or is not valid (lines 462, 464, 466), the server can send a not-found message (box 468). The system 10 can then display an appropriate error message to the purchaser, as would be understood by one of skill in the art.

Figure 9A:
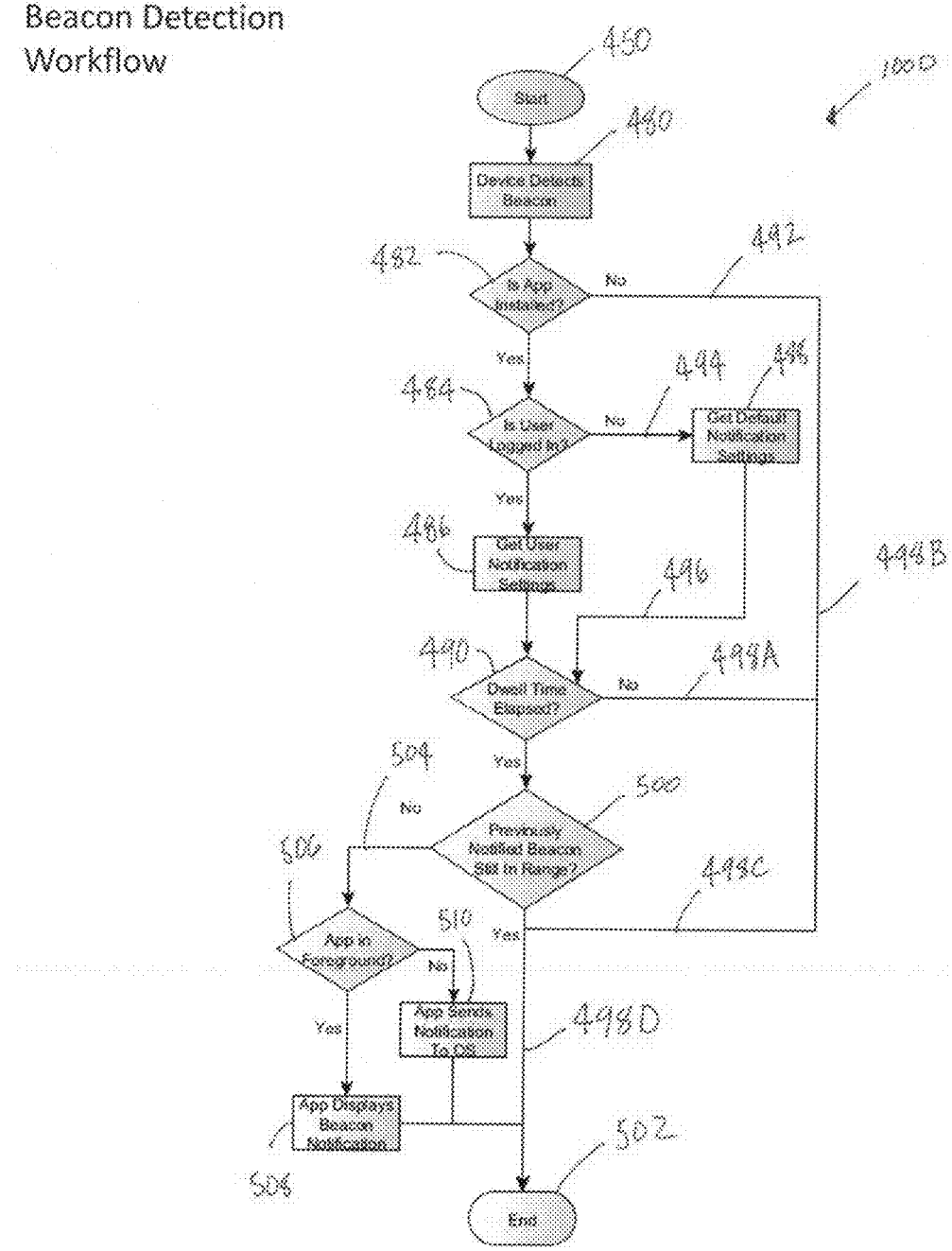
FIG. 9A is a flow chart showing a system response to beacon detection, according to an exemplary embodiment.

As discussed, FIG. 9A illustrates the software 100D workflow when a Bluetooth-enabled device 34 detects a beacon 20. In this implementation, when an enabled device 34 is brought into proximity of a beacon 20 (box 450), the device 34 is able to detect beacons 20 by way of Bluetooth or some other hardware, software or firmware. As would be apparent to one of skill in the art, several implementations are possible. In these implementations, when the device 34 is within range of a beacon 20, it will detect the beacon 20 (box 480). Because the beacon 20 is associated with a specific target URL 28 in the database 220, when a commercial user 12 or purchaser 32 has the software 100 installed on their device 34 (box 482), the device's 34 operations system can be set to permit the software 100D to access the target URL 28 and notify the commercial user 12 or purchaser 32.

As shown in FIG. 9A, in certain implementations, the software 100 assesses whether the purchaser is logged in (box 484). If the user or purchaser is logged in, the software will load the user or purchaser's beacon notification settings (box 486). If the user or purchaser is not logged in (line 494), the software will load the default notification settings (box 488, line 496). The software 100D next evaluates the user or purchaser's dwell time against the saved criteria (box 490). If the dwell time criteria are not yet met, the software 100D continues the process until the dwell time criteria have been met (line 498A-498B to box 482 and 490). When the software 100D determines that the dwell time criteria have been met, the software 100D determines whether or not the user or purchaser has exited the range of a previously notified beacon (box 500). If the user or purchaser's device is still detecting a previously notified beacon, the software 100D continues the process until the dwell time criteria have again been met (line 498C-498B to box 482 and 490) or the process will end (line 498D to box 502), and the software 100D will not display a notification. This prevents the software 100 from displaying recurring notifications by waiting until the device exits the range of previously notified beacons 20 before displaying another notification. Previous notification, exit and re-entry is described further in relation to FIG. 9B, and dwell time is discussed in relation to FIG. 3A.

Continuing with FIG. 9A, if the beacon notification has not been previously triggered (line 504), the software 100D will determine if the mobile application 40 is running in the foreground (box 506). If the application 40 is running in the foreground, it will display a beacon notification (box 508). If the application 40 is not running in the foreground, the software 100D will send a notification to the device operations system to notify the purchaser (box 510).

Figure 9B:
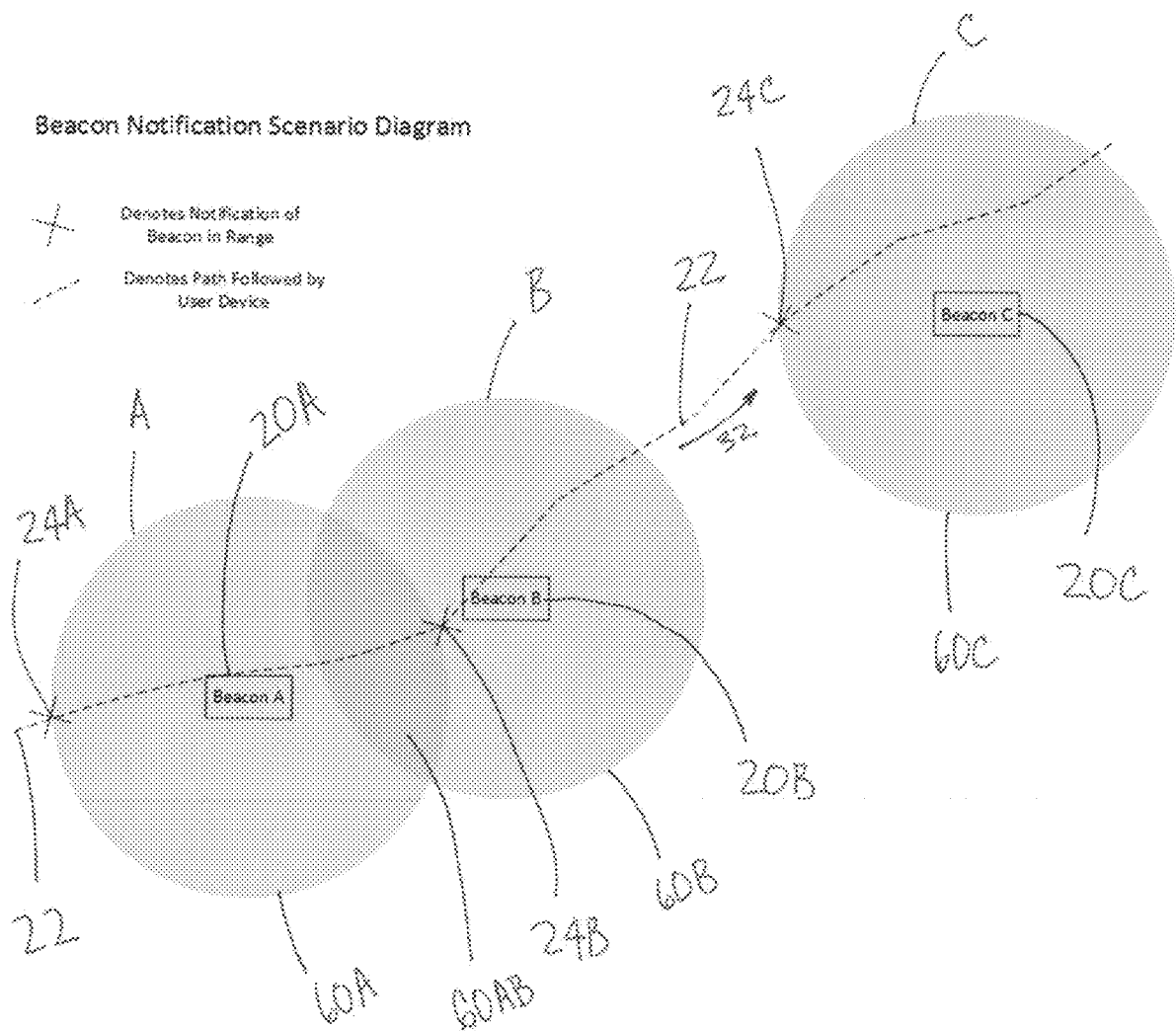
FIG. 9B is a top-view schematic showing a purchaser entering several ranges, according to an exemplary embodiment.

In FIG. 9B, a top-down schematic of multiple beacons 20A, 20B, 20C is shown. In this example, a purchaser (reference arrow 32) carrying a device 34 is traveling along a path 22 which traverses the ranges 60A, 60B, 60C of the beacons 20A, 20B, 20C. In so doing, the purchaser 32 is presented with notifications 24A, 24B, 24C as to the presence of the beacons 20A, 20B, 20C. As is shown in FIG. 9B, the purchaser is notified 24A, 24C upon entry into the ranges 60A, 60C when they do not overlap. In this example, two beacons 20A, 20B ranges 60A, 60B also do overlap 60AB, so the notification 24B occurs when the purchaser 32 has exited the first range 60A so as to be solely within the second range 60B, as described in relation to FIG. 9A.

Figure 10:
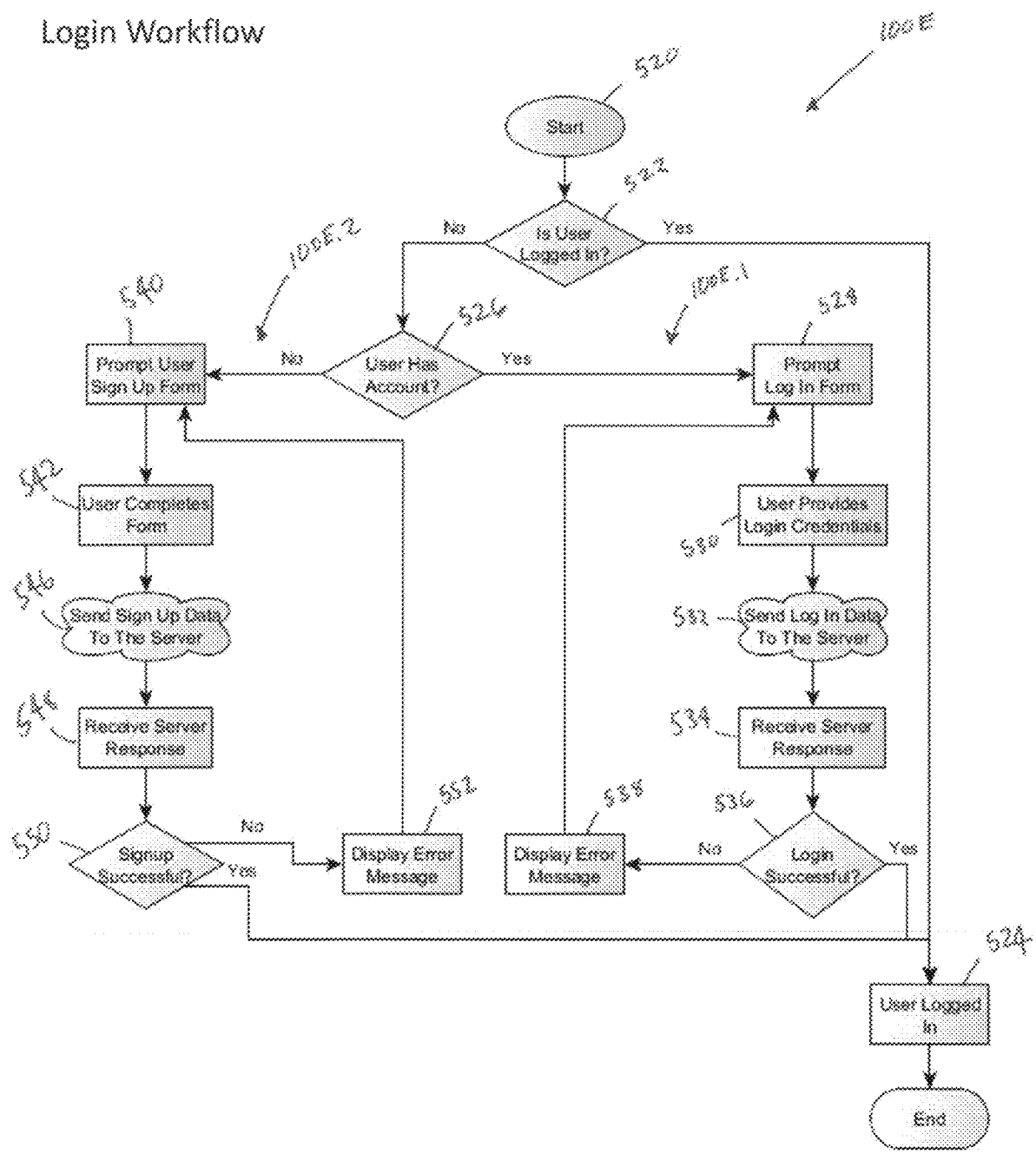
FIG. 10 depicts a flow chart of the software login workflow, according to an exemplary embodiment.

FIG. 10 depicts the software login workflow 100E, according to an exemplary embodiment. The login workflow 100E is responsible for communicating with the server 200 to allow purchasers to login to an existing account or create a new account. In the depicted implementation, the login workflow 100E is initiated (box 520) by the purchaser interacting with the system. The login workflow 100E queries whether the purchaser is currently logged-in (box 522). If so, the process is completed (box 524). If the purchaser (or user) is not logged in, the login workflow 100E queries whether the purchaser has an existing account (box 526). If the purchaser has an account, s/he enters the login process 100E.1, and is prompted to enter their credentials (box 528), the credentials are entered (box 530), the login data is transmitted to the server for authentication (box 532), that response is received (box 534), and the login success is evaluated (box 536). If successful, the process is completed (box 524). If unsuccessful, an error message display is displayed (box 538), and the login process 100E.1 is re-initiated. In further implementations, a commercial user 12 or purchaser 32 may also re-initiate the login process.

Continuing with FIG. 10, if the purchaser does not have an account, they are prompted to undergo the signup process 100E.2. The platform requests that the purchaser enter their personal login information into the platform (box 540), the platform accepts that personal login information (box 542), the personal login information is sent to the server (box 546), the server responds (box 548). If signup is successful, the purchaser is logged in and the process is completed (box 524). If unsuccessful, an error message display is displayed (box 552), and the signup process 100E.2 is re-initiated. In further implementations, a commercial user 12 or purchaser 32 may also re-initiate the signup process.

Figure 11:
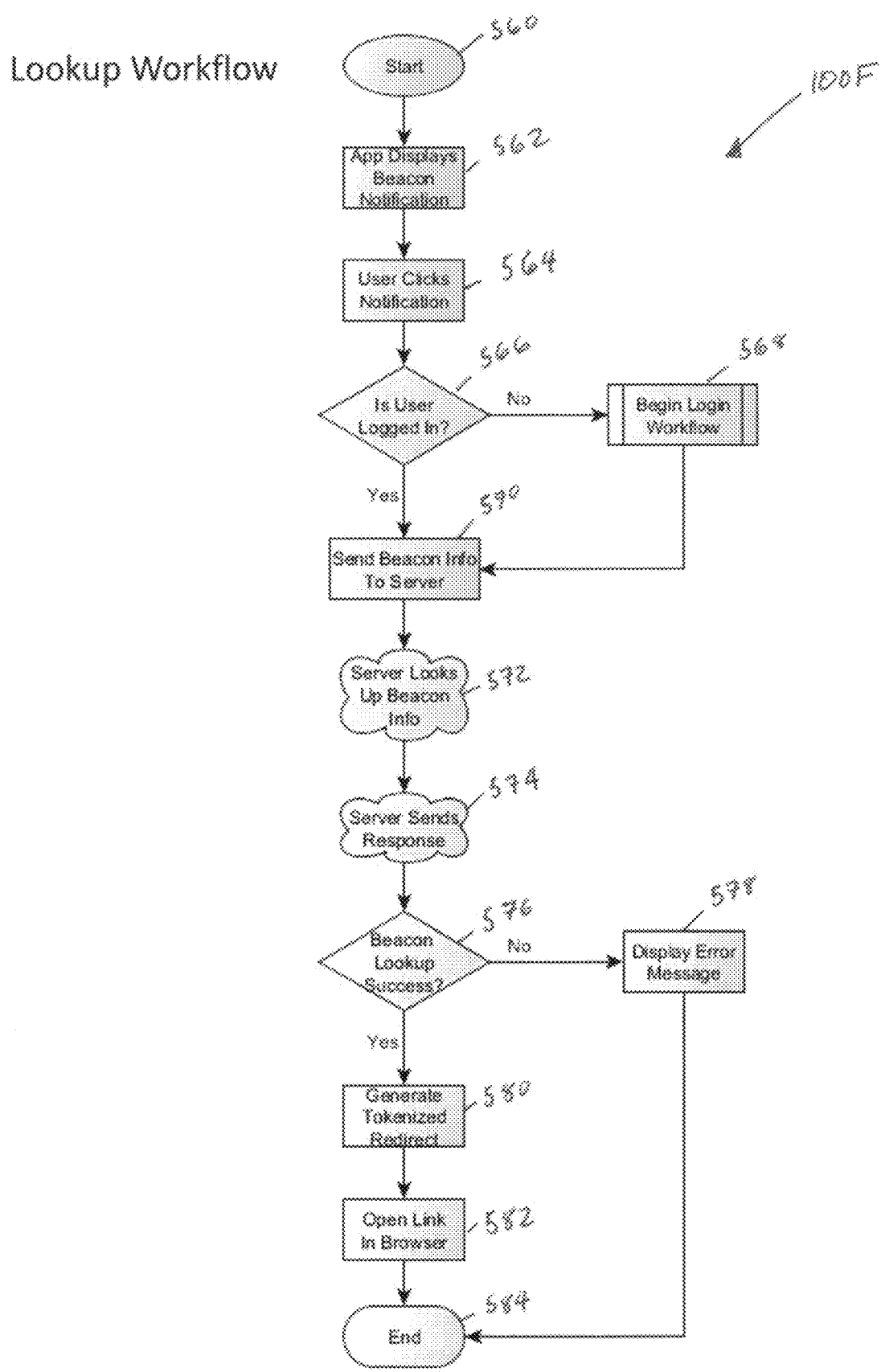
FIG. 11 depicts the beacon lookup workflow, according to an exemplary embodiment.

FIG. 11 depicts the beacon lookup workflow 100F. As is shown in FIG. 11, after detecting a beacon, the system (represented at 560) will display a beacon notification to the purchaser (box 562). However, in certain embodiments, the system 560 will wait to look up the listing information until the purchaser opens the purchaser notification (box 562). When the purchaser initiates the listing lookup (box 564), the lookup workflow 100F will first check if the purchaser is logged in (box 566) and prompt them to do so if they are not (box 568—as described in detail in relation to FIG. 10).

Continuing with FIG. 11, in these embodiments once the purchaser is logged in, the lookup workflow 100F will send the beacon information to the server (box 570). When prompted, the server 200 will look up the related target URL 28 on the database 220 and, if the target URL 28 is found (box 576), the lookup workflow 100F will generate a tokenized redirect (box 580), which will open a link in the purchaser's browser (box 582) and terminate the process. The return a of a token 600 is described further in relation to FIG. 12. If the target URL 28 is not found, the lookup workflow 100F will generate an error message (box 578). In either event, the process can terminate at this time (box 584).

Figure 12:
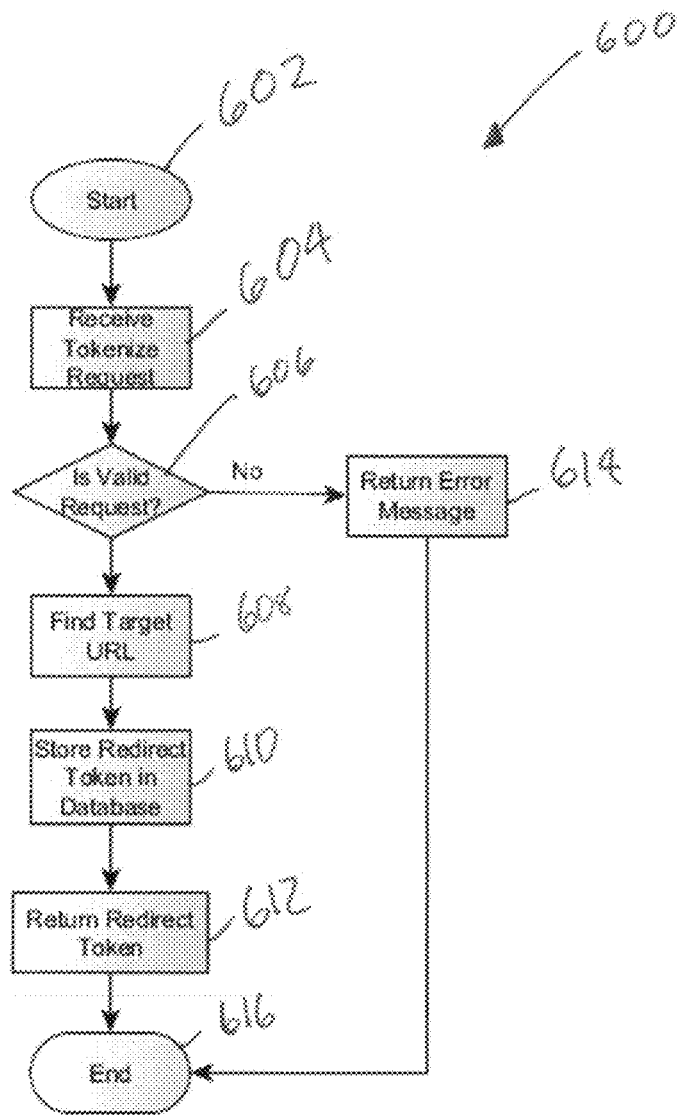
FIG. 12 is a flow chart of the process of creating a tokenized redirect process, or "token," according to an exemplary embodiment.
Figure 13:
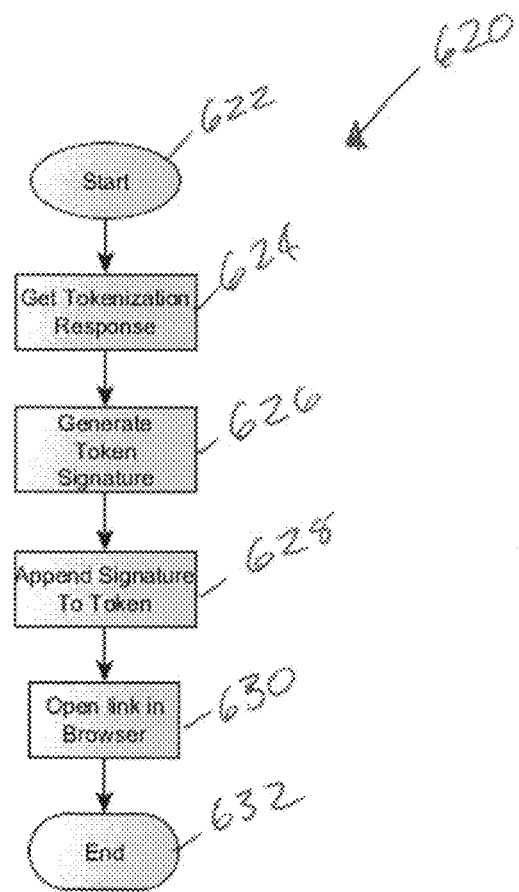
FIG. 13 depicts a flow chart of the tokenized redirection and opening, according to an exemplary implementation of the system.

FIG. 12 illustrates the process of creating a tokenized redirect process, or "token" 600. FIG. 13 depicts a workflow of the tokenized redirection and opening. With the token, the system 10 is able to open the listing information in an in-app web browser 36 on the purchaser's device 34A, as is described in relation to FIG. 1D, for example.

As is shown in FIG. 12, exemplary embodiments of the system 10 comprise a tokenized redirect process, or "token" 600, which allows the system 10 to target URLs 28 while ensuring a purchaser 32 is logged in. The tokenized redirect process allows a purchaser the full-functionality of the system 10 such as adding a listing to the purchaser's favorites and listing viewing history, as would be appreciated by one of skill in the art.

To create a secure tokenized redirect, the system initiates a request to the server to create a token (box 602), which is validated by the server (box 604). If the request is valid (box 606), a secure token and target URL will be associated (box 608) and stored (box 610) in the database. Subsequently, the system will return the token (box 612) for single use, as described in relation to FIGS. 10-11. In the event that the request is invalid, the system can return an error message (box 614) and terminate the process (box 616).

FIG. 13 depicts a workflow of the tokenized redirection and opening 620. In these embodiments, when the system 10 receives a successful tokenized redirect response (as described in relation to FIG. 12), the process of creating the tokenized signature is initiated. The system performs a hash of the token and appends it to the token 600.

As is shown in FIG. 13, after the process is initiated (box 622), the system receives the tokenized response (box 624) and generates a token signature (box 626). The signature is appended to the token (box 628) and a link to the listing is opened in a purchaser's browser (box 630) before terminating the workflow (box 632).

In some embodiments, the final URL follows the form: https:// . . . /{token}/{signature}. This URL creates a single-use redirection URL that the system 10 can utilize to open the link using an in-app browser. In certain embodiments, opening the token initiates a validation process on the server.

Figure 14:
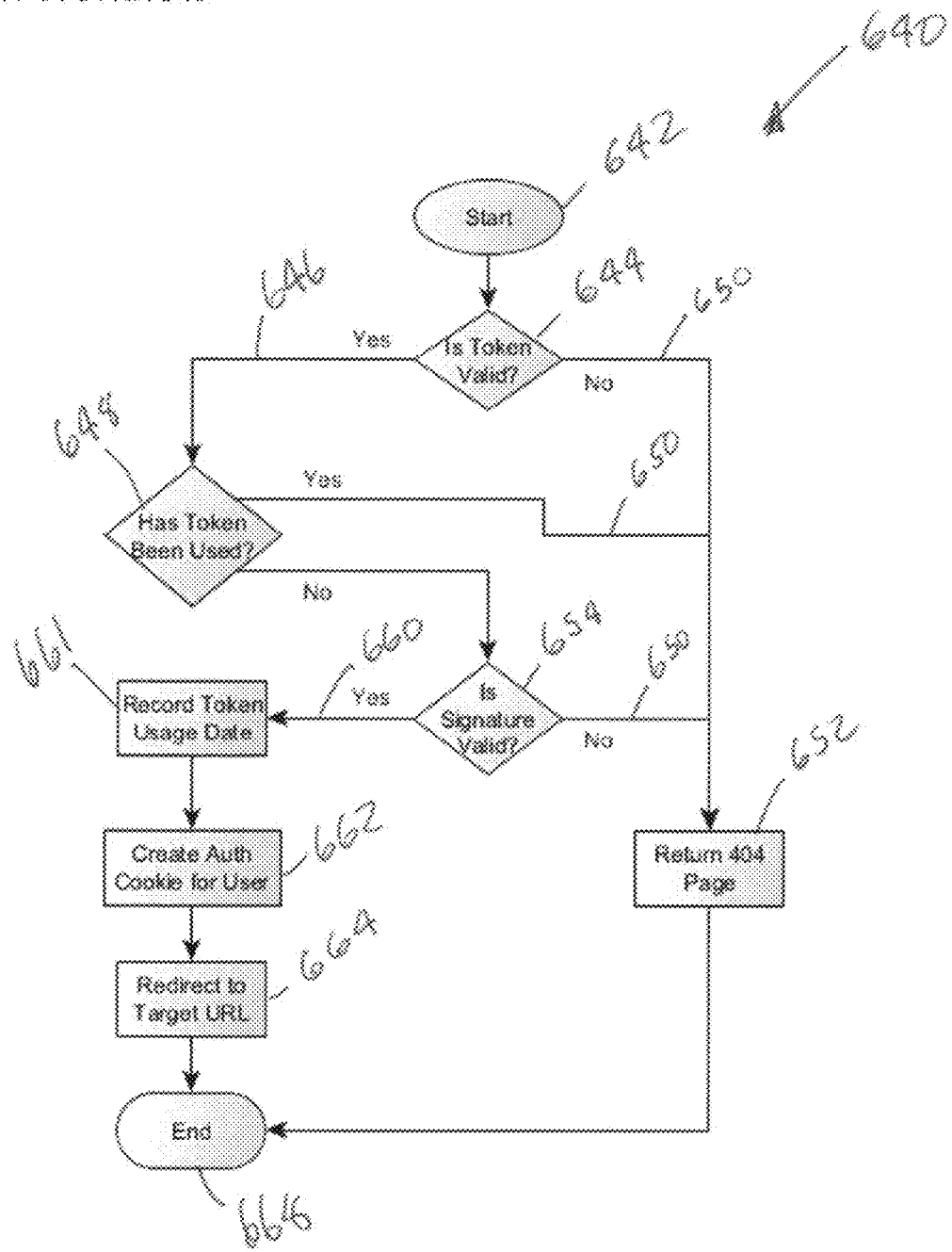
FIG. 14 depicts a flow chart of an exemplary embodiment of the system implementing a server tokenize redirection and validation work flow.

Accordingly, FIG. 14 depicts an exemplary embodiment of a server tokenize redirect workflow 640. In this embodiment, when the server detects a request to the tokenized redirect controller (box 642), the server will verify the request is valid (box 644). This is first done by checking if the token provided has been generated by the server. Once the token has been deemed valid (line 646), the server will check if the token has already been used (box 648). For security purposes, tokens may only be used once. If the token has not been used, the signature provided will be validated (box 654). Should the token fail to be valid, or if it has been used or has an invalid signature, the system initiates (lines 650) the return of a not found error (652).

If the token is valid, unused, and properly signed (line 660), the server will generate the signature using the same algorithm and key of the signature. This can be implemented with either a symmetric key algorithm or an asymmetric key algorithm. Anyone with understanding of either hashing or basic cryptography knowledge (or access to an SDK where either is implemented) would be able to recreate this validation process. If the signature is valid, the token usage date will be recorded (box 661) in the database and the user will be redirected to the target URL and the server can generate an authorization cookie (box 662) for the user's browser.

Various examples combine dynamic short URL remapping with radio frequency ("RF") and non-RF beacons. For example, a signaling device—such as an RFID Beacon, Apple iBeacon, or NFC Beacon—can be combined with a printed sign, or can be used in the absence of a printed sign to provide contextually relevant information to a user based on their proximity to the signaler. Using dynamic URL assignment allows a printed sign and an RF beacon to be treated as a single 'signaler' and to be dynamically mapped to information that can be moved. Further, in exemplary embodiments, a plurality of signaling devices, or beacons, can be used in conjunction with one another to allow recognition by several platforms. For example, an iBeacon and Eddystone can both be used in conjunction with a single signaler so as to work with both Apple and Android devices, respectively. As would be apparent to one of skill in the art, further variations are possible.

For example, an Apple iBeacon can be combined with a printed real estate sign. When the user comes into proximity of the sign, an App on their smart phone can hear the beacon, and can direct the user to information on the Internet for the home that is for sale. Simplicity is provided to the real estate agent by allowing them to simply map a real estate sign to a real estate listing, and masking the underlying complexity of having to assign both the iBeacon and the sign to the same information.

This can also be applied to provide a user with location specific information. For example an airport could be equipped with RF beacons such as RFID Beacon, Apple iBeacon, NFC Beacon and signs that could give visitors contextually relevant information based on their location within the airport.

For example, while waiting at Gate 23 in an airport, someone waiting for a flight could be made aware of flights boarding at this gate and also for nearby gates. A printed sign could direct users to this information, and all the other capabilities are provided. This includes giving the user the information on the flight arriving at Gate 23, but also provides the ability for the Airport to dynamically link RF Beacons to the same information, and to collect analytics, and to provide other marketing, advertising or contextually relevant information such as evacuation notices, weather notices, and the like.

Although the disclosure has been described with reference to preferred embodiments, persons skilled in the art will recognize that changes may be made in form and detail without departing from the spirit and scope of the disclosed apparatus, systems and methods.

What is claimed is:

1. A reusable signaling system for associating an indicator with networked target Uniform Resource Locators (URLs), comprising:
   a. a first signaler, the first signaler comprising a permanent indicator comprising a first permanent human readable short URL and the first signaler affixed to a first assigned physical asset;
   b. a second signaler, the second signaler comprising a permanent indicator comprising a second permanent human readable short URL and the second signaler affixed to a second assigned physical asset; and
   c. an operations system comprising:
      i. a networked server;
      ii. a networked database comprising a directory of target URLs, the directory comprising at least a first target URL, a second target URL, and a third target URL; and
      iii. a processor executing a signaler manager,
   wherein;
   a. the operations system is constructed and arranged to direct external requests to the first permanent human readable short URL to lookup the first target URL stored on the networked database and associated with the first assigned physical asset for redirection to the first target URL on the networked server;
   b. the operations system is constructed and arranged to direct external requests to the second permanent human readable short URL to lookup the second target URL stored on the networked database and associated with the second assigned physical asset for redirection to the second target URL on the networked server;
   c. the operations system is constructed and arranged to generate deep analytics comprising at least one of a time of day, a location, and a duration for each external request;
   d. the signaler manager is constructed and arranged to:
      i. assign the first signaler to the first target URL and the first assigned physical asset;
      ii. assign the second signaler to the second target URL and the second assigned physical asset; and
      iii. re-assign the first signaler to the third target URL and a third assigned physical asset;
   e. an analytics platform is constructed and arranged to generate lead information about users who access a target URL via its corresponding short URL; and
   f. the operations system comprises character and case sensitivity disambiguation for the first permanent human readable short URL and the second permanent human readable short URL.

2. The reusable signaling system of claim 1, further comprising a custom domain human readable short URL.

3. The reusable signaling system of claim 2, wherein the first signaler further comprises a wireless communicator.

4. The reusable signaling system of claim 3, further comprising a mobile application.

5. The reusable signaling system of claim 4, wherein the mobile application is constructed and arranged to detect a wireless communicator range and provide a notification including the first permanent human readable short URL or the first assigned target URL.

6. The reusable signaling system of claim 1, wherein the first signaler is a real estate sign and the first and second target URLs are associated with real estate listings.

7. A reusable association system for associating assets with target Uniform Resource Locators (URLs), comprising:
   a. a first signaler comprising a first wireless communicator and a first permanent human readable short URL;
   b. a second signaler comprising a second wireless communicator and a second permanent human readable short URL; and
   c. an operations system comprising:
      i. a processor;
      ii. a networked server; and
      iii. a database comprising a plurality of target URLs,
   wherein:
   a. the processor is constructed and arranged to record an association of a first target asset with a first target URL with the first signaler within the database for external resolution in response to a request;
   b. the operations system is constructed and arranged such that the processor can re-assign the first signaler to a second target asset and a second target URL within the database for external resolution in response to a request;
   c. the first and second wireless communicators are constructed and arranged to communicate with a user device;
   d. the first permanent human readable short URL and the second permanent human readable short URL are associated with a same target URL; and
   e. the operations system is constructed and arranged to record when the first permanent human readable short URL is requested and when the second permanent human readable short URL is requested.

8. The reusable association system of claim 7, further comprising a tokenized redirection process.

9. The reusable association system of claim 7, further comprising a cloud management system.

10. The reusable association system of claim 7, further comprising a mobile application.

11. The reusable signaling system of claim 7, wherein the first wireless communicator comprises a range wherein the user device detects the first wireless communicator when the user device is within the range of the first wireless communicator.

12. The reusable signaling system of claim 11, wherein the first wireless communicator is detected after the user device is within the range of the first wireless communicator for a set amount of time.

13. A system for associating an asset with a target URL for a prospective purchaser on a mobile device, the system comprising:
   a. at least one reusable signaler comprising a permanent human readable short URL;
   b. an operations system;
   c. a networked server;
   d. a networked database in operational communication with the networked server, the networked database comprising a plurality of target URLs including a first target URL and a second target URL;
   e. a signaler manager comprising, a custom domain Application Programming Interface (API); and
   f. a processor executing the signaler manager,
   wherein the operations system is constructed and arranged to direct external request to the permanent human readable short URL to lookup the first target URL stored on the networked database and associated with a first physical asset for redirection to the first target URL on a third-party server when the signaler is affixed to the first physical asset, and
   wherein the signaler manager is constructed and arranged to re-assign the reusable signaler to the second target URL associated with a second physical asset when the signaler is affixed to the second physical asset
   wherein the operations system comprises character and case sensitivity disambiguation for the permanent human readable short URL.

14. The system of claim 13, wherein the operations system is constructed and arranged to generate analytics and evaluate referral sources.

15. The system of claim 14, wherein the system further comprises an advertising platform.

16. The system of claim 13, further comprising a permanent human readable short URL platform.

17. The system of claim 13, wherein a plurality of permanent human readable short URLs are associated with the first target URL.

18. The system of claim 13, wherein the permanent human readable short URL is a custom domain human readable short URL.

* * * * *

UNITED STATES PATENT AND TRADEMARK OFFICE
CERTIFICATE OF CORRECTION

PATENT NO. : 10,915,595 B1  
APPLICATION NO. : 14/877512  
DATED : February 9, 2021  
INVENTOR(S) : Donald J Van Oort, Christopher Van Oort and Christopher Waters Page 1 of 1

It is certified that error appears in the above-identified patent and that said Letters Patent is hereby corrected as shown below:

On the Title Page

Item (54) and in the Specification, Column 1, Lines 1-3, In the title:  
The word "TENGIBLE" should be "TANGIBLE"  
The term "AN WEBSITE" should be "A WEBSITE"

Signed and Sealed this  
Twentieth Day of September, 2022

Katherine Kelly Vidal  
*Director of the United States Patent and Trademark Office*